(12) United States Patent
Hildreth

(10) Patent No.: US 10,687,050 B2
(45) Date of Patent: Jun. 16, 2020

(54) METHODS AND SYSTEMS OF REDUCING LATENCY IN COMMUNICATION OF IMAGE DATA BETWEEN DEVICES

(71) Applicant: QUALCOMM Incorporated, San Diego, CA (US)

(72) Inventor: Evan Hildreth, Maple (CA)

(73) Assignee: QUALCOMM Incorporated, San Diego, CA (US)

(*) Notice: Subject to any disclaimer, the term of this patent is extended or adjusted under 35 U.S.C. 154(b) by 82 days.

(21) Appl. No.: 15/456,371

(22) Filed: Mar. 10, 2017

(65) Prior Publication Data
US 2018/0262687 A1    Sep. 13, 2018

(51) Int. Cl.
*H04N 13/344* (2018.01)
*H04N 13/204* (2018.01)
*H04N 5/232* (2006.01)
*H04N 13/296* (2018.01)
*H04N 5/357* (2011.01)
(Continued)

(52) U.S. Cl.
CPC ............. *H04N 13/344* (2018.05); *G06K 9/32* (2013.01); *H04N 5/2329* (2013.01); *H04N 5/23206* (2013.01); *H04N 5/23238* (2013.01); *H04N 5/3572* (2013.01); *H04N 13/204* (2018.05); *H04N 13/239* (2018.05); *H04N 13/296* (2018.05); *G06T 2210/22* (2013.01)

(58) Field of Classification Search
CPC ............ H04N 13/332; H04N 13/344; H04N 2213/008; H04N 5/23293; H04N 13/204; H04N 13/296; H04N 13/239; H04N 5/23206; H04N 5/23238; H04N 5/2329; H04N 5/3572; G06T 2210/22; G06K 9/32
See application file for complete search history.

(56) References Cited

U.S. PATENT DOCUMENTS 8,138,991 B2    3/2012   Rorberg et al.
8,903,568 B1 *  12/2014  Wang ................... G05D 1/0016
                                                  701/2
9,838,687 B1 *  12/2017  Banta ................ H04N 19/00903
(Continued)

OTHER PUBLICATIONS

Kopf J., "360 video stabilization: A new algorithm for smoother 360 video viewing", Retrieved from the Internet: URL: https://code.facebook.com/posts/697469023742261/360-video-stabilization-a-new-algorithm-for-smoother-360-video-viewing/ [retrieved on Aug. 31, 2016], 8 Pages.

*Primary Examiner* — James R Sheleheda
(74) *Attorney, Agent, or Firm* — QUALCOMM Incorporated

(57) ABSTRACT

Methods, apparatus, and computer-readable media are provided for processing image data captured by a first device for display on a second device. For example, a range of predicted orientations of the second device can be determined. A predicted field-of-view of the second device can then be determined. The predicted field-of-view corresponds to the range of predicted orientations of the second device. The predicted field-of-view can be transmitted to the first device. Cropped image data may then be received from the first device, which includes image data cropped to include the predicted field-of-view. An updated orientation of the second device can be determined, and an updated field-of-view within the cropped image data can be determined that corresponds to the updated orientation of the second device.

27 Claims, 16 Drawing Sheets

(51) Int. Cl.
*H04N 13/239* (2018.01)
*G06K 9/32* (2006.01)

(56) References Cited

U.S. PATENT DOCUMENTS

| | | | | |
|---|---|---|---|---|
| 9,986,221 | B2* | 5/2018 | Zhou | G06F 3/012 |
| 9,992,449 | B1* | 6/2018 | Ashkenazi | H04N 7/147 |
| 10,110,814 | B1* | 10/2018 | Day | H04N 5/23238 |
| 2004/0010803 | A1* | 1/2004 | Berstis | H04N 5/23206 |
| | | | | 725/105 |
| 2015/0254870 | A1* | 9/2015 | Knibbe | G06T 7/20 |
| | | | | 345/633 |
| 2016/0012855 | A1* | 1/2016 | Krishnan | H04N 21/4728 |
| | | | | 386/241 |
| 2016/0026253 | A1 | 1/2016 | Bradski et al. | |
| 2016/0148431 | A1 | 5/2016 | Seydoux et al. | |
| 2016/0217760 | A1* | 7/2016 | Chu | G06T 1/20 |
| 2016/0219267 | A1* | 7/2016 | Chu | H04L 65/605 |
| 2016/0219325 | A1* | 7/2016 | Chu | H04N 21/42653 |
| 2016/0238841 | A1* | 8/2016 | LaValle | G02B 27/017 |
| 2016/0297522 | A1 | 10/2016 | Brulez et al. | |
| 2016/0309207 | A1* | 10/2016 | Brav | H04N 5/23206 |
| 2017/0003764 | A1* | 1/2017 | Li | G06T 19/006 |
| 2017/0018121 | A1* | 1/2017 | Lawson | G06T 3/0093 |
| 2017/0115488 | A1* | 4/2017 | Ambrus | G02B 27/0172 |
| 2017/0123415 | A1* | 5/2017 | Thorn | A61B 5/024 |
| 2017/0200315 | A1* | 7/2017 | Lockhart | H04N 5/23238 |
| 2017/0251176 | A1* | 8/2017 | Smolyanskiy | G02B 27/017 |
| 2017/0251204 | A1 | 8/2017 | Gupte et al. | |
| 2017/0287220 | A1* | 10/2017 | Khalid | G06T 19/006 |
| 2017/0289219 | A1* | 10/2017 | Khalid | H04L 65/4084 |
| 2017/0310945 | A1* | 10/2017 | Juang | G01S 17/86 |
| 2017/0316607 | A1* | 11/2017 | Khalid | G06T 19/006 |
| 2017/0371353 | A1* | 12/2017 | Millinger, III | G01S 5/0263 |
| 2018/0047332 | A1* | 2/2018 | Kuwahara | G06F 3/147 |
| 2018/0061454 | A1* | 3/2018 | Herberger | H04N 21/43637 |
| 2018/0063504 | A1* | 3/2018 | Haines | H04N 7/183 |
| 2018/0160119 | A1* | 6/2018 | Su | H04N 19/597 |
| 2018/0176468 | A1* | 6/2018 | Wang | H04N 19/46 |
| 2018/0181119 | A1* | 6/2018 | Lee | G05D 1/0038 |
| 2018/0192001 | A1* | 7/2018 | Boyce | H04N 19/70 |
| 2018/0247421 | A1* | 8/2018 | DeAngelis | G06K 9/3241 |
| 2018/0293736 | A1* | 10/2018 | Rahimi | G06T 7/20 |
| 2018/0302557 | A1* | 10/2018 | Rogers | H04N 21/23439 |
| 2018/0342066 | A1* | 11/2018 | Mallinson | G06T 7/20 |
| 2018/0349698 | A1* | 12/2018 | Gustafsson | G02B 27/017 |
| 2018/0352255 | A1* | 12/2018 | Hinds | H04N 19/597 |
| 2019/0236794 | A1* | 8/2019 | Nash | G06K 9/6215 |
| 2019/0335287 | A1* | 10/2019 | Jung | H04S 3/008 |
| 2019/0356894 | A1* | 11/2019 | Oh | G06F 3/012 |
| 2020/0004236 | A1* | 1/2020 | Wang | B64C 39/024 |

* cited by examiner

METHODS AND SYSTEMS OF REDUCING LATENCY IN COMMUNICATION OF IMAGE DATA BETWEEN DEVICES

FIELD

The present disclosure generally relates to reducing communication latency, and more specifically to techniques and systems for reducing latency in communication of image data between devices.

BACKGROUND

Many devices and systems allow image data to be captured, processed, and output for consumption. In some systems, a remote-controlled device can contain one or more cameras that capture video as the device is moved throughout an environment. The remote-controlled device can send the captured image data to a controller device for display. In some cases, the image data can be sent in response to a request from the controller device for images of a scene at which the remote-controlled device is located. Various issues can arise in such systems, including latency in communicating the image data from the remote-controlled device to the controller device.

BRIEF SUMMARY

In some embodiments, techniques and systems are described for reducing communication latency in communication of image data from a remote-controlled device to a receiver-controller device. In some cases, the remote-controlled device can include a drone or unmanned aerial vehicle (UAE), and the receiver-controller device can include a wearable device (e.g., a virtual reality (VR) headset, another type of head-mounted viewing device, or other suitable wearable device). For example, a head-mounted viewing device may be used while piloting a drone. The head-mounted viewing device can display images of a scene captured by the drone in the display of the head-mounted viewing device, allowing a user to view the scene from the perspective of the drone. While piloting the drone, the user may rotate his or her head to look around the scene from the drone's perspective. The head-mounted viewing device can send orientation information corresponding to an orientation of the head-mounted viewing device (e.g., corresponding to the head orientation of the user). The drone can capture and return images from the perspective of the orientation.

A roundtrip latency can result in systems that include a remote-controlled device providing image data to a receiver-controller device. For example, in drone-VR headset systems, a roundtrip latency can occur due to transmission of the orientation of the VR headset (head orientation) to the drone, rotation of a mechanical gimbal or processing of a digital gimbal on the drone, and transmission of the video from the drone back to the VR headset. Such roundtrip latency may provide too much lag, since VR headsets require minimal latency in responding to head rotation of the user in order to avoid motion sickness.

Receiver-controller devices (e.g., VR headsets, head-mounted viewing device, or other wearable device) can use stereo views to display image data. The stereo views may be recorded with stereo cameras. If a digital gimbal is processed from a stationary stereo pair of cameras, the intraocular distance is not constant. In order to maintain the intraocular distance and geometry between the cameras, the stereo cameras as a unit can be mounted to a mechanical gimbal and rotated as a unit. However, such a configuration may be very bulky and can limit the functionality of the drone.

The systems and methods described herein reduce latency in response to head motion. In some implementations, the systems and methods can provide a stereo view for proper depth perception. In some examples, a drone can capture image data including a full view of a camera on the drone. In some implementations, the image data can include a monocular image and depth data, as opposed to using stereo cameras in combination with a mechanical or digital gimbal. A field of view (FoV) is determined that is larger than a last known head-mounted viewing device (e.g., VR headset) FoV by an amount that includes the maximum a user is expected to turn his or her head within a roundtrip latency period. The FoV is within the full camera view of the captured image data. The drone can crop only the portion of the full camera view that includes the determined FoV, and can transmit the cropped view to the head-mounted viewing device. The cropped image data can be encoded (or compressed) before being transmitted to the head-mounted viewing device. The head-mounted viewing device can calculate a new or updated FoV of the viewing device based on the most up-to-date motion tracking data indicating an orientation and/or position of the head-mounted viewing device. The updated FoV of the head-mounted viewing device is within the cropped view provided from the drone since the FoV making up the cropped view is larger than the last known head-mounted viewing device FoV by the maximum expected head movement within the roundtrip latency period. The head-mounted viewing device can then synthesize the view from the up-to-date motion tracking data to be displayed to the user.

According to at least one example, a method of processing image data captured by a first device for display on a second device is provided. The method includes determining a range of predicted orientations of the second device. The method further includes determining a predicted field-of-view of the second device corresponding to the range of predicted orientations of the second device. The method further includes transmitting the predicted field-of-view to the first device, and receiving cropped image data from the first device. The cropped image data includes image data cropped to include the predicted field-of-view. The method further includes determining an updated orientation of the second device, and determining an updated field-of-view within the cropped image data. The updated field-of-view corresponds to the updated orientation of the second device.

In another example, an apparatus is provided that includes a memory configured to store data and a processor. The processor is configured to determine a range of predicted orientations of the apparatus, and to determine a predicted field-of-view of the apparatus corresponding to the range of predicted orientations of the apparatus. The processor is further configured to transmit the predicted field-of-view to the first device, and to receive cropped image data from the first device. The cropped image data includes image data cropped to include the predicted field-of-view. The processor is further configured to determine an updated orientation of the apparatus, and to determine an updated field-of-view within the cropped image data. The updated field-of-view corresponds to the updated orientation of the apparatus.

In another example, a non-transitory computer-readable medium having stored thereon instructions that, when executed by one or more processors, cause the one or more processor to: determine a range of predicted orientations of the second device; determine a predicted field-of-view of the second device corresponding to the range of predicted orientations of the second device; transmit the predicted field-of-view to the first device; receive cropped image data from the first device, wherein the cropped image data includes image data cropped to include the predicted field-of-view; determine an updated orientation of the second device; and determine an updated field-of-view within the cropped image data, the updated field-of-view corresponding to the updated orientation of the second device.

In another example, an apparatus is provided that includes means for determining a range of predicted orientations of the second device. The apparatus further includes means for determining a predicted field-of-view of the second device corresponding to the range of predicted orientations of the second device. The apparatus further includes means for transmitting the predicted field-of-view to the first device, and means for receiving cropped image data from the first device. The cropped image data includes image data cropped to include the predicted field-of-view. The apparatus further includes means for determining an updated orientation of the second device, and means for determining an updated field-of-view within the cropped image data. The updated field-of-view corresponds to the updated orientation of the second device.

In some aspects, the method, apparatuses, and computer-readable medium described above may further include rendering a left eye view and a right eye view corresponding to the updated field-of-view. In some aspects, a single image view may be rendered corresponding to the updated field-of-view.

In some aspects, the first device is a drone and the second device is a wearable device. The wearable device can include a head-mounted viewing device, a VR headset, or any other suitable wearable device.

In some aspects, determining the range of predicted orientations of the second device includes: determining a roundtrip latency time between the first device and the second device; and predicting the range of predicted orientations of the second device during the roundtrip latency time.

In some aspects, the range of predicted orientations of the second device are based on predicted movement of the second device.

In some aspects, the range of predicted orientations of the second device is determined using a human kinematic model, the human kinematic model being based on at least one or more of an orientation, an angular velocity, and a rate of acceleration or deceleration of the second device.

In some aspects, the predicted field-of-view encompasses a range of fields of view corresponding to predicted orientations of the range of predicted orientations.

In some aspects, determining the predicted field-of-view of the second device includes determining an image region encompassing the range of predicted orientations of the second device.

In some aspects, the updated orientation of the second device results from actual movement of the second device.

In some aspects, the predicted field-of-view includes a world-centric predicted field-of-view, wherein the world centric predicted field-of-view is remapped to a drone-centric field-of-view, and wherein the image data is captured according to the drone-centric field-of-view.

According to at least one other example, a method of providing image data captured by a first device for display on a second device is provided. The method includes obtaining, by the first device, a predicted field-of-view of the second device. The predicted field-of-view corresponds to a range of predicted orientations of the second device. The method further includes capturing image data. The method further includes generating cropped image data by cropping the image data to include the predicted field-of-view. The method further includes transmitting the cropped image data to the second device. The cropped image data is configured to be used by the second device to determine an updated field-of-view within the cropped image data. The updated field-of-view corresponds to an updated orientation of the second device.

In another example, an apparatus is provided that includes a memory configured to store data and a processor. The processor is configured to obtain a predicted field-of-view of a device. The predicted field-of-view corresponds to a range of predicted orientations of the device. The processor is further configured to capture image data. The processor is further configured to generate cropped image data by cropping the image data to include the predicted field-of-view. The processor is further configured to transmit the cropped image data to the device. The cropped image data is configured to be used by the device to determine an updated field-of-view within the cropped image data. The updated field-of-view corresponds to an updated orientation of the device.

In another example, a non-transitory computer-readable medium having stored thereon instructions that, when executed by one or more processors, cause the one or more processor to: obtain a predicted field-of-view of a device, the predicted field-of-view corresponding to a range of predicted orientations of the device; capture image data; generate cropped image data by cropping the image data to include the predicted field-of-view; transmit the cropped image data to the device, wherein the cropped image data is configured to be used by the device to determine an updated field-of-view within the cropped image data, the updated field-of-view corresponding to an updated orientation of the device.

In another example, an apparatus is provided that includes means for obtaining a predicted field-of-view of a device. The predicted field-of-view corresponds to a range of predicted orientations of the device. The apparatus further includes means for capturing image data. The apparatus further includes means for generating cropped image data by cropping the image data to include the predicted field-of-view. The apparatus further includes means for transmitting the cropped image data to the device. The cropped image data is configured to be used by the device to determine an updated field-of-view within the cropped image data. The updated field-of-view corresponds to an updated orientation of the device.

In some aspects, the first device is a drone and the second device is a wearable device. The wearable device can include a head-mounted viewing device, a VR headset, or any other suitable wearable device.

In some aspects, the predicted field-of-view encompasses a range of fields of view corresponding to predicted orientations of the range of predicted orientations.

In some aspects, the range of predicted orientations of the second device are based on predicted movement of the second device.

In some aspects, the range of predicted orientations of the second device are based on predicted movement of the second device during a round trip latency time between the first device and the second device.

In some aspects, the updated orientation of the second device results from actual movement of the second device.

In some aspects, the predicted field-of-view includes a world-centric predicted field-of-view. In such aspects, the method, apparatuses, and computer-readable medium described above may further include: remapping the world-centric predicted field-of-view to a drone-centric field-of-view; and capturing the image data according to the drone-centric field-of-view.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
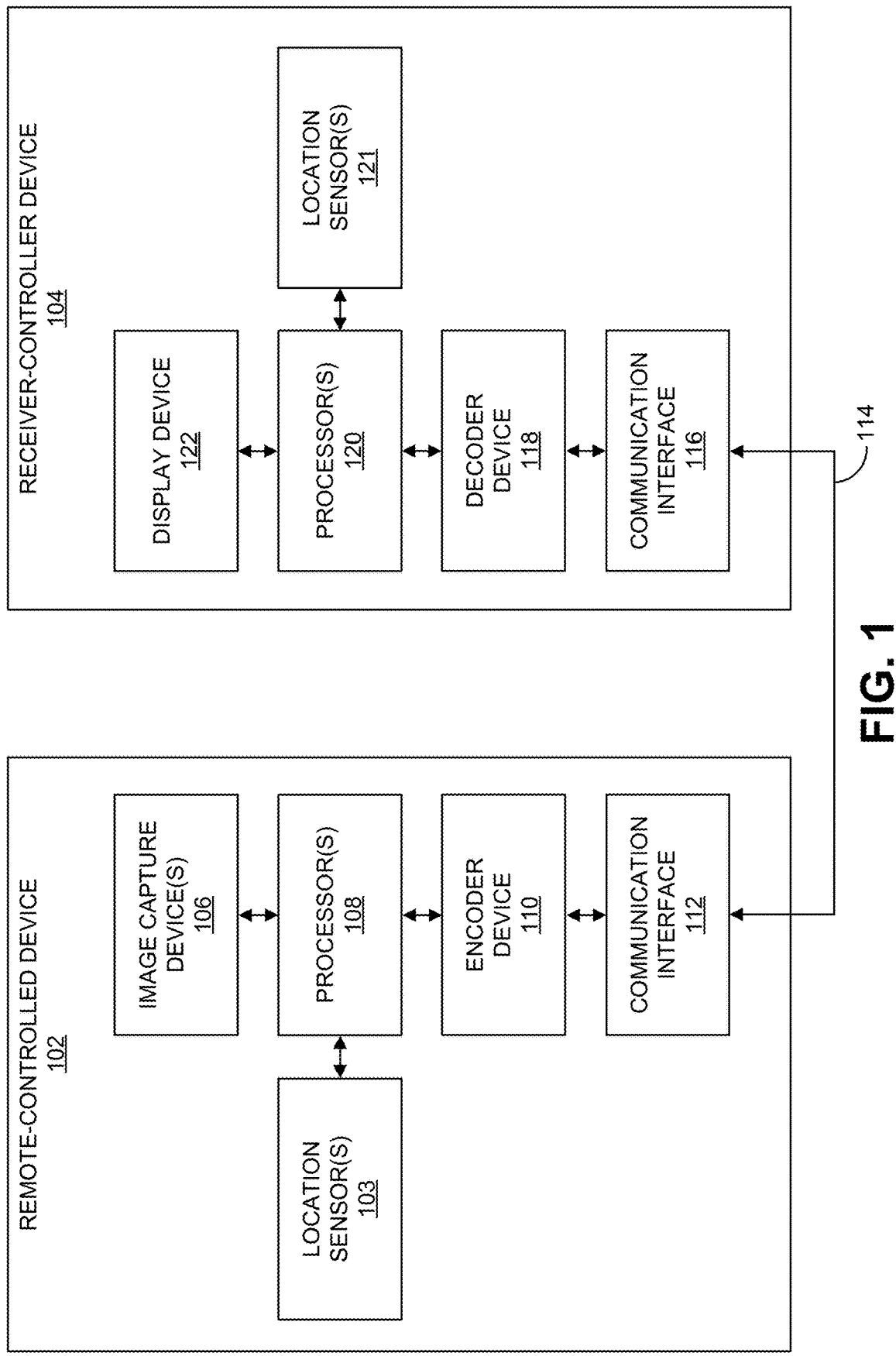
FIG. 1 is a block diagram illustrating an example of a remote-controlled device and a receiver-controller device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality (VR) is the ability to be virtually present in a non-physical world created by the rendering of natural and/or synthetic images and sound correlated by the movements of the immersed user, allowing the user to interact with that world. With the recent progress made in rendering devices (e.g., head-mounted viewing devices such as VR headsets or head mounted displays (HMD)) and in VR video creation, a significant quality of experience can be offered. VR applications including gaming, training, education, sports video, online shopping, adult entrainment, and so on.

In some examples, a VR system can include various components and can perform various steps. For example, a VR system can include a camera set. The camera set can include multiple individual cameras pointing to different directions (with different views) and ideally collectively covering all viewpoints around the camera set. The VR system can obtain the video pictures captured by the cameras of the camera set, and can perform image stitching. For example, an image stitching device can receive the video pictures from the camera set. In some examples, image stitching includes obtaining the video pictures taken by the multiple individual cameras and synchronizing the video pictures in the time domain and stitching the video pictures in the space domain to be a spherical video, but mapped to a rectangular format, such as equi-rectangular (e.g., a world map), cube map, pyramid map, or other suitable map.

The video in the mapped rectangular format is then encoded (or compressed) using a video codec (e.g., an MPEG codec, a H.265/HEVC codec, or a H.264/AVC codec). The compressed video bitstream(s) may be stored and/or encapsulated in a media format and transmitted through a network to a receiver. In some cases, only the subset covering only the area being seen by a user can be transmitted. For example, a transmission side of the VR system can generate encapsulated files from the encoded video data (e.g., using an ISOBMFF format a file format derived from ISOBMM, a DASH-based media presentation description, or any other suitable file format). For instance, the video codec can encode the video data and an encapsulation engine can generate the media files by encapsulating the video data in one or more ISOBMFF media files or other suitable type of media files.

A receiver can then receive the encoded (or compressed) video bitstream(s), possibly encapsulated in a file format. A codec in the receiver can decode (or decompress) the encoded video bitstream(s). In some instances, the receiver can parse the media files with encapsulated video data to generate the encoded video data. For example, the receiver can parse the media files with the encapsulated video data to generate the encoded video data, and the codec in the receiver can decode the encoded video data.

The receiver can send the decoded video signal to a rendering device. The rendering device can be, for example, a head-mounted viewing device (e.g., a VR headset or HMD) or other wearable rendering device. In some cases, the head-mounted viewing device can include the receiver and decoder. The head-mounted viewing device, such as a VR headset, can track head movement and eye movement of a user and can render the corresponding part of the video such that an immersive experience is presented to the user.

In some cases, a VR system can include a remote-controlled device and a receiver-controller device. As described in more detail below, systems and methods are described herein for reducing communication latency in communication of image data from a remote-controlled device to a receiver-controller device.

FIG. 1 illustrates an example of a remote-controlled device 102 and a receiver-controller device 104. The receiver-controller device 104 can control the remote-controlled device 102, and can receive and display image data from the remote-controlled device 102. As described in more detail below, the image data can include monocular images and depth data in some examples. In some implementations, the remote-controlled device 102 can include a flying drone or unmanned aerial vehicle (UAE), a land-bound vehicle, a water-bound vehicle, or any other device that can capture image data and be controlled using a remote controller device. Illustrative examples of a flying drone or UAE include rotary-wing drones (e.g., helicopters, quadricopters, or the like), wing-based drones, or any other suitable flying drone.

The receiver-controller device 104 can include a wearable device, such as a virtual reality (VR) headset or other head-mounted viewing device, that controls the remote-controlled device 102. Implementations are described below using a VR headset as an example of the wearable device. However, one of ordinary skill will appreciate that the techniques and systems described herein can be used by any other suitable wearable device, such as head-mounted viewing devices other than VR headsets. In some implementations, the wearable device can include the controls needed to operate the remote-controlled device 102. In some implementations, the receiver-controller device 104 can also include a control panel that can be used in combination with the wearable device. For example, in such implementations, the receiver-controller device 104 can include the wearable device for rendering and viewing image data sent from the remote-controlled device and for performing other operations described herein, and can also include a control panel that can be used in combination with the wearable device to maneuver the remote-controlled device 102. Illustrative examples of a control panel can include a mobile electronic device, such as a smartphone, a tablet, or other suitable device. A user can input piloting commands into the control panel using a user interface, such as a touchscreen, a keypad with buttons, a gesture-recognition interface that can recognize hand or bodily gestures, or any other suitable user interface. In some implementations, the controller-receiver device 104 can include or be part of a ground control station.

The remote-controlled device 102 and receiver-controller device 104 communicate over a communication link 114. The communication link 114 may include one or more channels provided by a wireless network, a wired network, or a combination of a wired and wireless network. A wireless network may include any wireless interface or combination of wireless interfaces and may include any suitable wireless network (e.g., a WiFi network, the Internet or other wide area network, a packet-based network, a radio frequency (RF) network, a UWB network, a WiFi-Direct network, a cellular network, a Long-Term Evolution (LTE) network, a WiMax network, a Bluetooth network, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like.

The remote-controlled device 102 includes one or more image capture devices 106 that can capture image data (e.g., video images or frames, still images, or the like) of scenes within an environment. The one or more image capture devices 106 can include any suitable device that can capture image data or video, such as any suitable video camera and/or still image camera. One illustrative example of a camera can include a rolling shutter camera. In some implementations, the one or more image capture devices 106 can include a single camera. In some implementations, the one or more image capture devices 106 can include multiple cameras (e.g., two or more cameras) for capturing multiple views of a scene. In some examples, one or more processors 108 can select one or more cameras necessary to capture a certain field of view (FoV). In some cases, views of multiple cameras can be stitched together, as described further herein. In some implementations, the one or more image capture devices 106 can include a stereo pair of cameras. For example, in such implementations, the one or more image capture devices 106 can be mounted to a mechanical gimbal that can be rotated to move the cameras to different orientations. In another example, the one or more image capture devices 106 can include a stationary stereo pair of cameras that can be implemented with a digital gimbal. The one or more image capture devices 106 can include any suitable lens, such as a fish-eye lens (e.g., having an ultra-wide angle focal length), a wide angle lens, a standard lens, or any other suitable type of lens.

In some implementations, the one or more image capture devices 106 can capture one or more monocular views (e.g., a color image) of a scene. For example, a monocular view can be captured for a particular FoV of the remote-controlled device 102. A monocular view includes a single view of a scene, as opposed to stereo views of the scene, and can lack depth information. The one or more image capture devices 106 can also include one or more depth sensors that can capture depth data of certain image regions (e.g., a ROI corresponding to a captured monocular image of a scene). The one or more depth sensors can include a stereo pair of cameras, time-of-flight sensors, structured light sensors, a combination thereof, or any other sensor that can capture depth information. The depth information can include disparity data (from stereo cameras) or depth data (from any type of depth sensor). In some cases, the one or more image capture devices 106 can include multiple depth sensors. The one or more processors 108 can select the depth sensors necessary to capture a FoV of the remote-controlled device 102. The one or more processors 108 can stitch the depth data of the multiple depth sensors together. In one illustrative example, a drone having four depth sensors, each observing a 90 degree FoV, may require three depth sensors (capturing a total 270 degree FoV) to capture a specific 180 degree FoV.

The remote-controlled device 102 also includes one or more location sensors 103. The one or more location sensors 103 can include any suitable sensor that can provide location data for determining a position and/or orientation of the remote-controlled device 102. In some examples, the one or more location sensors 103 can include one or more gyroscopes, one or more accelerometers, one or more ultrasonic range sensors, a combination thereof, or any other suitable location sensor. In one illustrative example, the one or more processors 108 can calculate a position and orientation of the remote-controlled device 102 using a Visual Inertial Ordometry algorithm, utilizing one or more of gyroscope data, accelerometer data, image data, ultrasonic range sensor data, a combination thereof, or any other suitable location data.

The image data captured by the one or more image capture devices 106 can be captured as video frames. The captured video frames can be provided to an encoder device 110. The encoder device 110 can include any suitable encoder (or codec), such as an H.264/AVC encoder (or codec), H.265/HEVC encoder (or codec), an MPEG encoder (or codec, including a H.261, H.262, or H.263 codec), or any other suitable encoder (or codec). In some examples, the remote-controlled device 102 can also capture audio data, which can be compressed using an audio codec (not shown). Coded pictures are output as an encoded video bitstream from the encoder device 110 to the communication interface 112.

The image data (e.g., compressed or uncompressed monocular images and depth data) is transmitted to the receiver-controller device 104 using the communication interface 112. In some examples, the communication interface 112 includes a communication driver, such as a Media Access Control/Physical layer (MAC/PHY) driver, a cellular communications driver, or any other device for communicating data. For example, the driver can include a transceiver, a digital signal processor, and other circuitry that is needed to transmit (and receive in some cases) packetized digital image data using a certain protocol (e.g., a WiFi protocol using MAC/PHY driver circuitry, an Long Term Evolution (LTE) protocol, or other suitable communication protocol).

The receiver-controller device 104 receives the image data (e.g., the encoded video bitstream, uncompressed image data, or the like) over the communication link 114 using the communication interface 116. In some examples, the communication interface 114 includes a communication driver, such as a MAC/PHY driver, a cellular communications driver, or any other device for communicating data. For example, the driver can include a transceiver, a digital signal processor, and other circuitry that is needed to receive (and transmit in some cases) packetized digital image data using a certain protocol (e.g., a WiFi protocol using MAC/PHY driver circuitry, an Long Term Evolution (LTE) protocol, or other suitable communication protocol).

In cases in which the image data is coded (compressed), the coded image data is provided to the decoder device 118 for decoding. The decoder device 118 can include any suitable decoder (or codec), such as an H.264/AVC decoder (or codec), H.265/HEVC decoder (or codec), an MPEG decoder (or codec, including a H.261, H.262, or H.263 codec), or any other suitable decoder (or codec). In some examples, the receiver-controller device 104 can also include an audio codec (not shown) for decoding compressed audio data.

The receiver-controller device 104 also includes one or more location sensors 121. The one or more location sensors 121 can include any suitable sensor that can provide location data for determining a position and/or orientation of the receiver-controller device 104. In some examples, the one or more location sensors 121 can include one or more gyroscopes, one or more accelerometers, one or more ultrasonic range sensors, a combination thereof, or any other suitable location sensor. In one illustrative example, the one or more processors 120 can calculate a position and orientation of the receiver-controller device 104 using a Visual Inertial Ordometry algorithm, utilizing one or more of gyroscope data, accelerometer data, image data, ultrasonic range sensor data, a combination thereof, or any other suitable location data.

As noted above, the receiver-controller device 104 can include or be a VR headset. In some examples, the one or more processors 120 can use location data from the one or more location sensors 121 to determine a position and/or orientation of the VR headset. As described in more detail below, the position and/or orientation of the VR headset can be transmitted to the remote-controlled device 102 over the communication link 114. The one or more processors 120 can also use the location data to determine a FoV of the VR headset, corresponding to a head position and/or orientation of the user wearing the VR headset.

The receiver-controller device 104 includes a display device 122 that can display the image data provided from the remote-controlled device 102. In some examples, the one or more processors 120 can determine or generate Left-Eye and Right-Eye views using the VR headset orientation and/or position the image data (e.g., a monocular view and depth data corresponding to the monocular view) provided from the remote-controlled device 102. The Left-Eye and Right-Eye views can then be displayed by the display device 122. The display device 122 can include any suitable display technology, such as an OLED display, an AMOLED display, an LED display, a LCD display, or other suitable display.

The remote-controlled device 102 provides a first person view (FPV) to the receiver-controller device 104. FPV enables a person using the receiver-controller device 104 to see what the remote-controlled device 102 sees (e.g., using the image capture device 106) in real-time and to control the maneuvering of the remote-controlled device 102 based on what is seen from the FPV. For example, a VR headset may be used while piloting a drone. The VR headset can display images of a scene captured by the drone in the display of the VR headset, allowing a user to view the scene from the perspective of the drone.

While piloting the remote-controlled device 102 using the receiver-controller device 104, the user may rotate his or her head (while wearing the VR headset) to look around the scene from the drone's perspective. As noted above, in VR headset-based systems, the VR headset can send position and/or orientation information corresponding to a position and/or orientation of the VR headset (e.g., corresponding to the head orientation of the user) to the remote-controlled device 102, and the remote-controlled device 102 can capture and return images of a FoV from the perspective of the received position and/or orientation.

Figure 2:
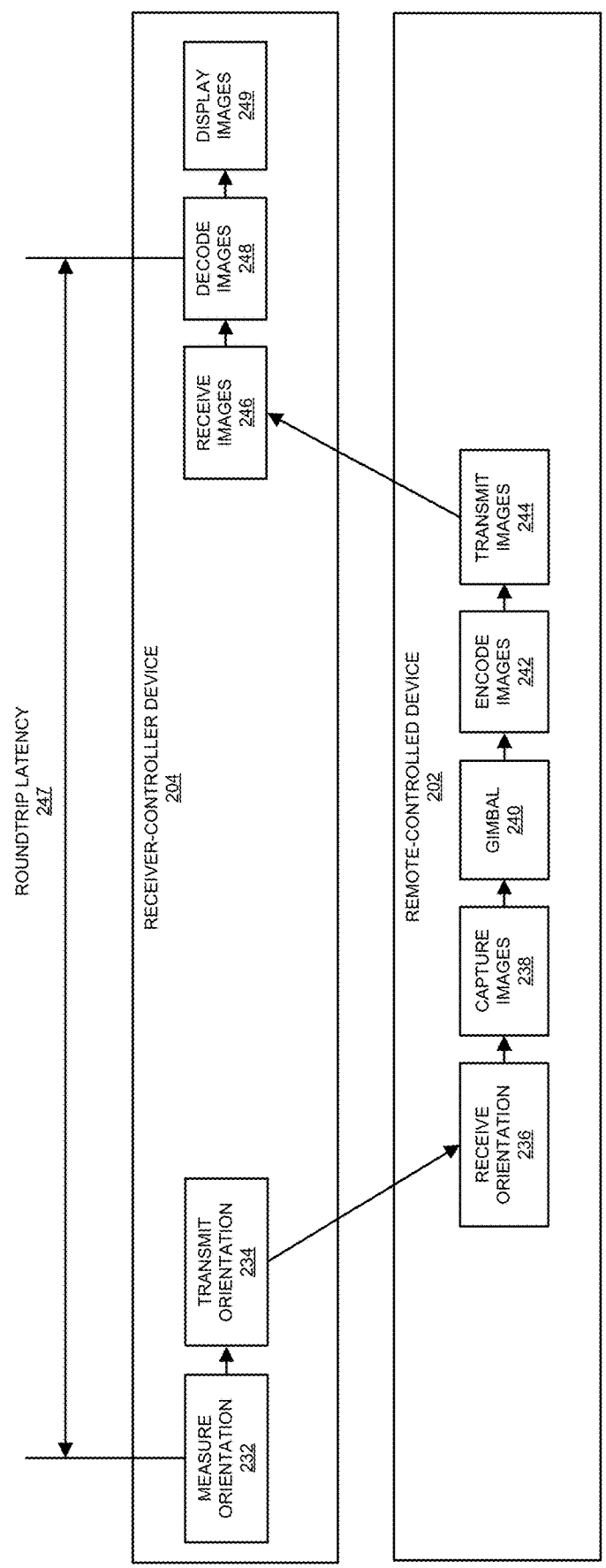
FIG. 2 is a block diagram illustrating a process of obtaining image data at a receiver-controller device from a remote-controlled device, in accordance with some examples.

FIG. 2 is a block diagram illustrating a process of obtaining image data at a receiver-controller device 204 from a remote-controlled device 202. The remote-controlled device 202 is similar to and can perform similar operations as the remote-controlled device 102. The receiver-controller device 204 is similar to and can perform similar operations as the receiver-controller device 104. At block 232, the receiver-controller device 204 measures its orientation (and position in some cases). For example, location data from one or more location sensors (e.g., location sensor(s) 121) can be used to determine the orientation and/or position of the receiver-controller device 204. The receiver-controller device 204 can include a VR headset, and the orientation and/or position can include the orientation and/or position of the VR headset. At block 234, the receiver-controller device 204 can transmit the orientation (and position in some cases) to the remote-controlled device 202.

At block 236, the remote-controlled device 202 receives the orientation and/or the position of the receiver-controller device 204. At block 238, the remote-controlled device 202 captures images of a scene (e.g., using image capture device(s) 106). For example, the captured images can include a field of view (FoV) that corresponds to the received orientation and/or position of the receiver-controller device 204. At block 240, a mechanical gimbal can be rotated or a digital gimbal can be processed to capture the images at block 238. At block 242, the captured images are encoded (e.g., using encoder device 110). The encoded images are transmitted back to the receiver-controller device 204 at block 244. At block 246, the receiver-controller device 204 receives the images. The images are decoded (e.g., using decoder device 118) at block 248. The decoded images are then displayed at block 249.

A roundtrip latency 247 can occur due to transmission of the position and/or orientation of the receiver-controller device 204 (VR headset) to the remote-controlled device 202, rotation of a mechanical gimbal or processing of a digital gimbal on the remote-controlled device 202, and transmission of the image data from the remote-controlled device 202 back to the receiver-controller device 204. A roundtrip latency 247 may provide too much lag in some instances. For instance, such lag is problematic for VR headsets or HMDs, which require minimal latency in responding to head rotation of the user in order to avoid motion sickness.

Figure 3:
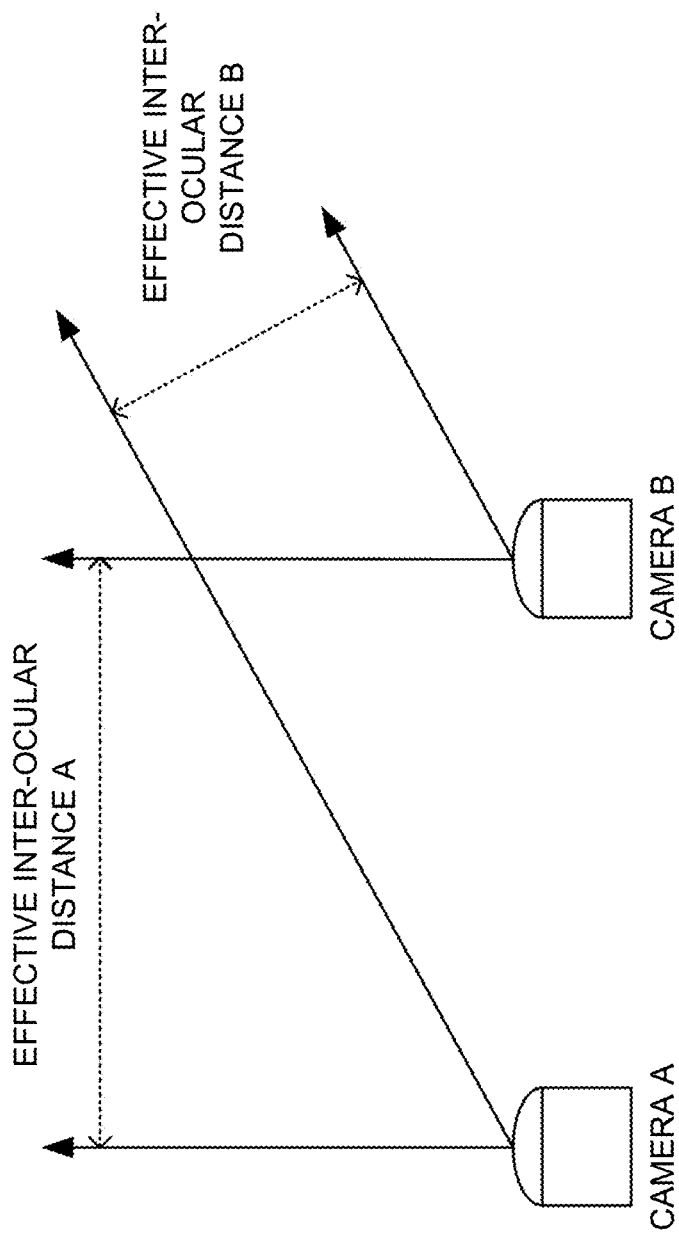
FIG. 3 is a diagram illustrating an example of inter-ocular distances between cameras of a remote-controlled device, in accordance with some examples.

Furthermore, VR headsets use stereo views to display image data (e.g., Left-Eye and Right-Eye views). The image data making up the stereo views may be recorded with stereo cameras on a remote-controlled device. FIG. 3 is a diagram illustrating an example of inter-ocular distances between stereo cameras (camera A and camera B) of a remote-controlled device. As shown, if a digital gimbal is processed from a stationary stereo pair of cameras, the inter-ocular distance is not constant. In order to maintain the inter-ocular distance and geometry between the cameras, the stereo cameras as a unit can be mounted to a mechanical gimbal and rotated as a unit. However, such a configuration may be very bulky and can limit the functionality of the drone.

The systems and methods described herein reduce communication latency in communication of image data from a remote-controlled device to a receiver-controller device. For example, the systems and methods can reduce latency in response to head motion of a user wearing a VR headset. In some cases, a stereo view can be provided for proper depth perception without the downside of inconsistent inter-ocular distances and bulky configurations.

Figure 4:
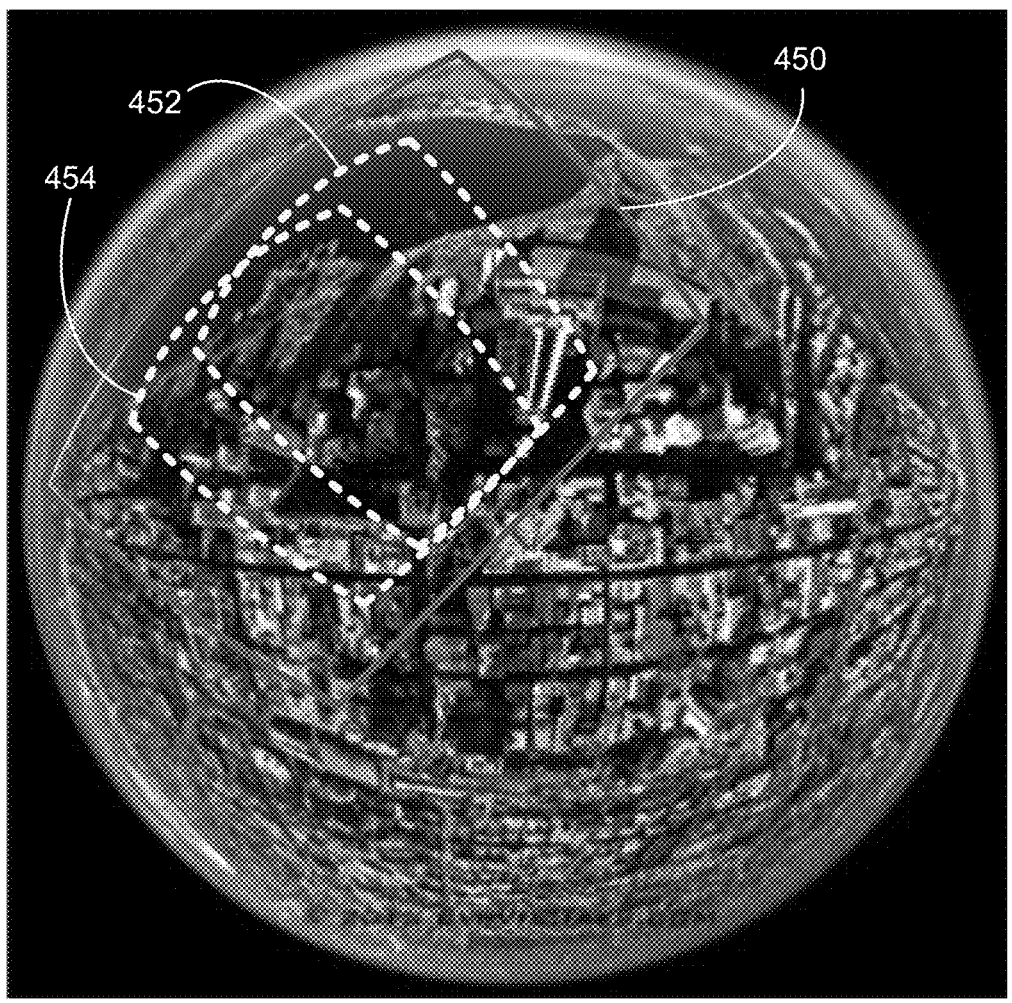
FIG. 4 is a diagram illustrating an example view of an image captured by a remote-controlled device, in accordance with some examples.

As described in more detail below, a remote-controlled device (e.g., a drone) can capture image data including a full view of one or more cameras on the remote-controlled device. FIG. 4 illustrates an example view of an image 400 captured by an image capture device (e.g., one or more cameras) of the remote-controlled device. The image 400 includes a full view of the image capture device. The image 400 can be captured according to orientation and/or position data of a receiver-controller device, including a VR headset. The image 400 can be a fish-eye image captured by a camera including a fish-eye lens. In some cases, the image 400 includes a monocular view (a color image) of a scene. In such cases, depth data can also be captured by the remote-controlled device. A field of view (FoV) 450 is determined that is larger than a last known VR headset FoV (including a Left-Eye FoV 454 and a Right-Eye FoV 452) by an amount that includes the maximum a user is expected to turn his or her head within a roundtrip latency period. For example, the VR headset can determine the FoV 450 taking into account a human kinematic model, as described below. The FoV 450 is within the full camera view of the captured image 400.

Figure 5:
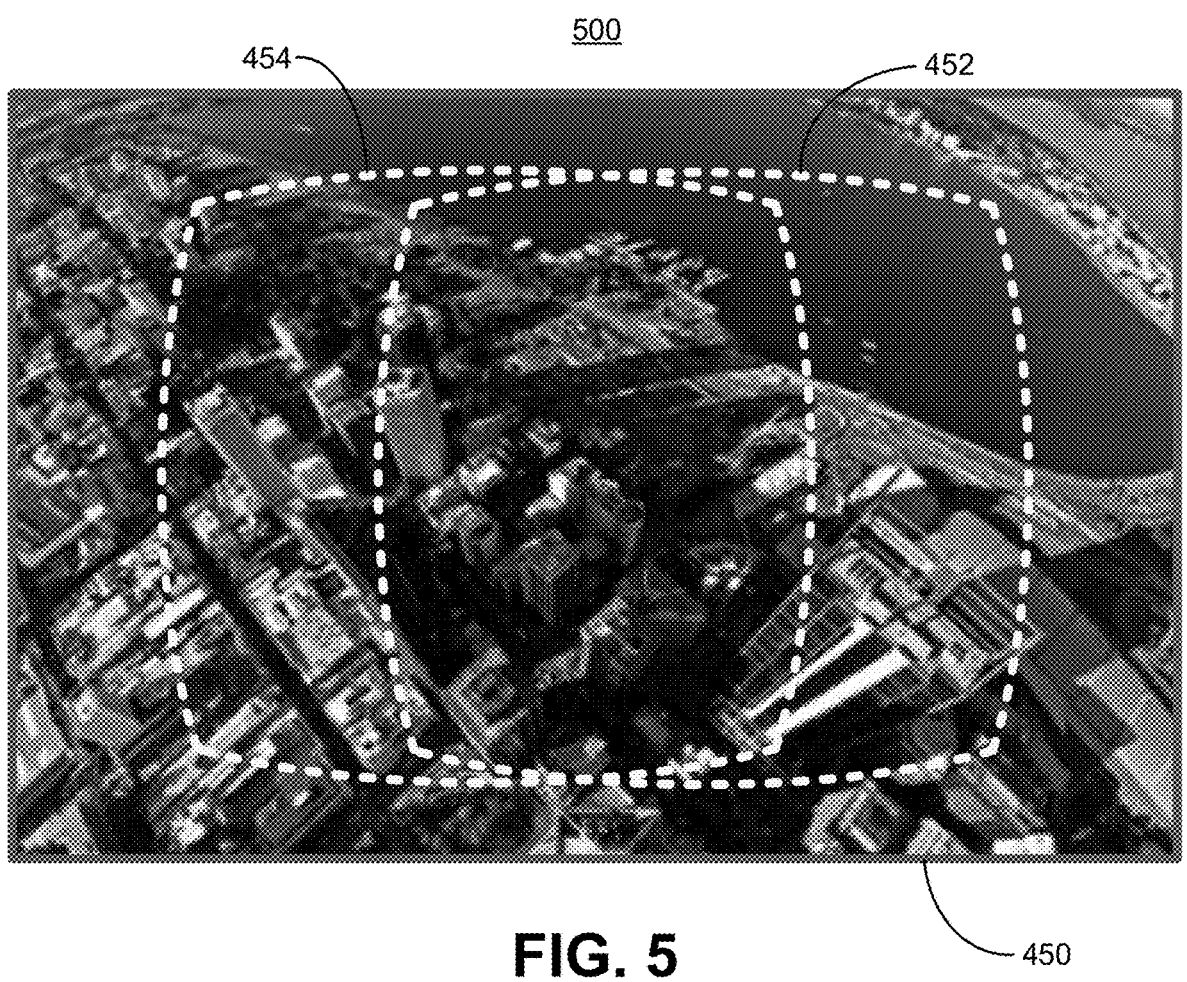
FIG. 5 is a diagram illustrating an example of a cropped view of the image captured by a remote-controlled device, in accordance with some examples.

The remote-controlled device can crop only the portion of the full camera view that includes the determined FoV 450 in order to reduce the amount of image data provided to the VR headset. When depth data is captured, the remote-controlled device can also crop only the depth data needed for the determined FoV 450. FIG. 5 shows an example of a cropped view 500 of the image 400 captured by the remote-controlled device. As shown, the cropped view includes the FoV 450 encompassing the last known VR headset FoV 452, 454 and an additional amount according to the estimated head movement of the user. In some cases, the cropped image data can be encoded (or compressed) before being transmitted to the VR headset.

Figure 6:
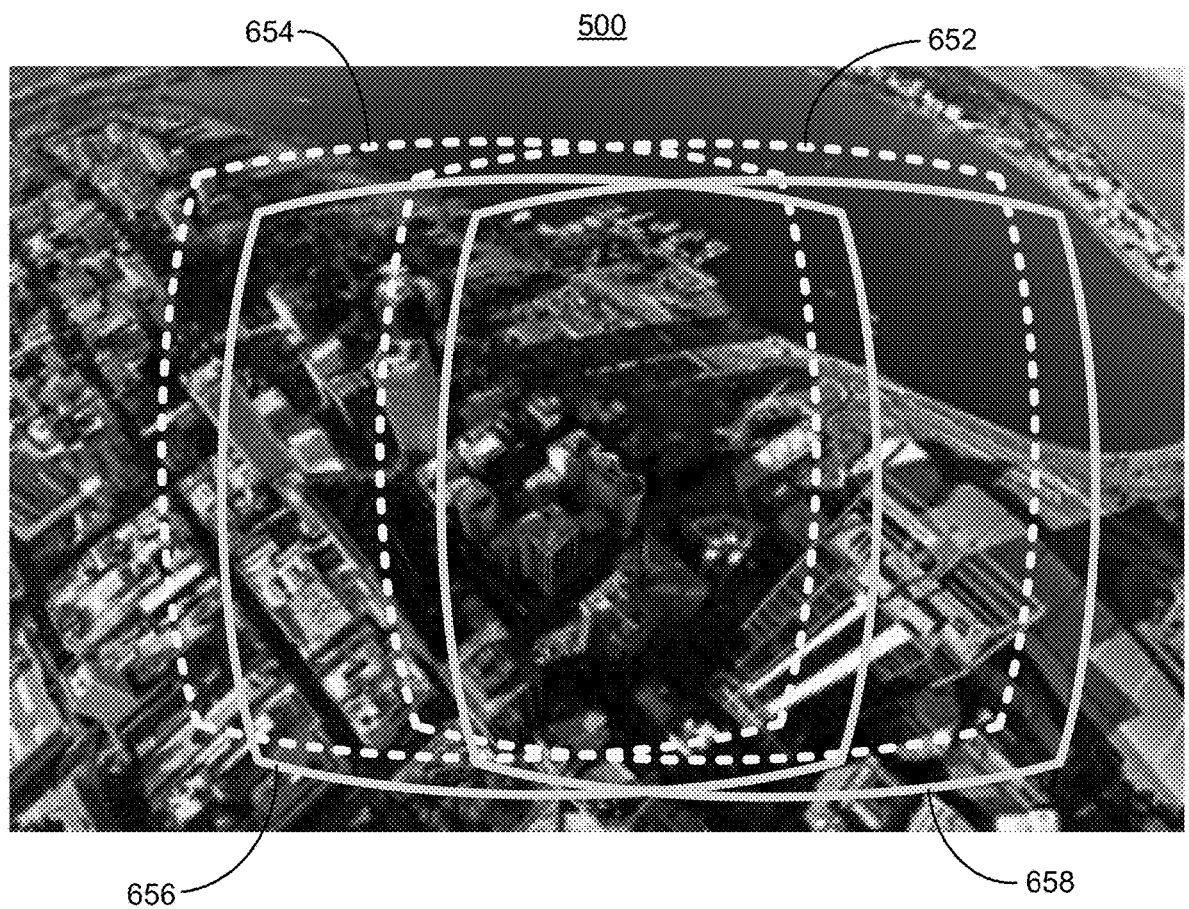
FIG. 6 is a diagram illustrating an example of a field of view of a receiver-controller device within a cropped image, in accordance with some examples.

The VR headset can calculate a new FoV (also referred to herein as an updated FoV) of the VR headset based on up-to-date motion tracking data indicating an orientation and/or position of the VR headset. For example, a more recently sampled VR headset orientation and/or position can be used rather than the headset orientation and/or position that was used to capture the images and data on the remote-controlled device. FIG. 6 shows an example of a new FoV (including a Left-Eye FoV 654 and a Right-Eye FoV 652) of a VR headset within the cropped image 500. The new FoV 654, 652 of the VR headset is within the cropped view 500 provided from the remote-controlled device since the FoV making up the cropped view 500 is larger than the last known VR headset FoV 452, 454 by the maximum expected head movement within the roundtrip latency period.

Figure 7B:
FIG. 7A and FIG. 7B include diagrams illustrating examples of stereo views synthesized using the field of view of the receiver-controller, in accordance with some examples.
Figure 7A:
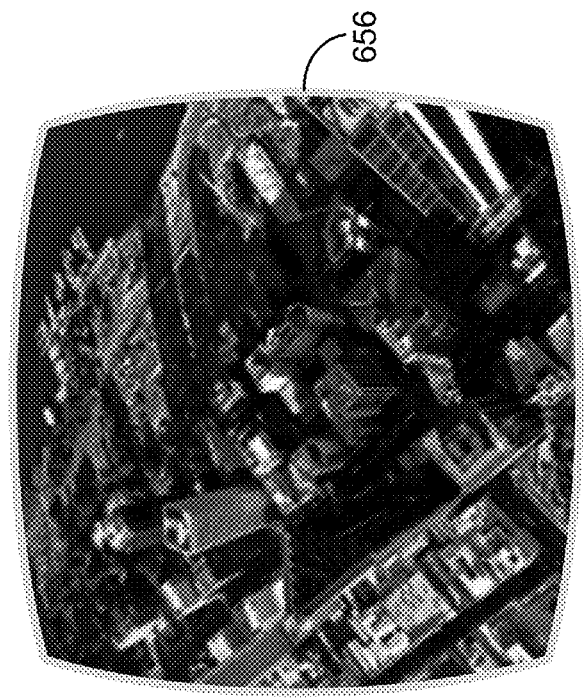

The VR headset can synthesize the view from the up-to-date motion tracking data to be displayed to the user (e.g., as a stereo view). FIG. 7A and FIG. 7B show examples of stereo views synthesized using the new FoV of the receiver-controller. FIG. 7A shows an image 700A of the Left-Eye view 656. FIG. 7B shows an image 700B of the Right-Eye view 658. In some cases, the stereo view can be generated using the cropped monocular image data and depth data.

Figure 8:
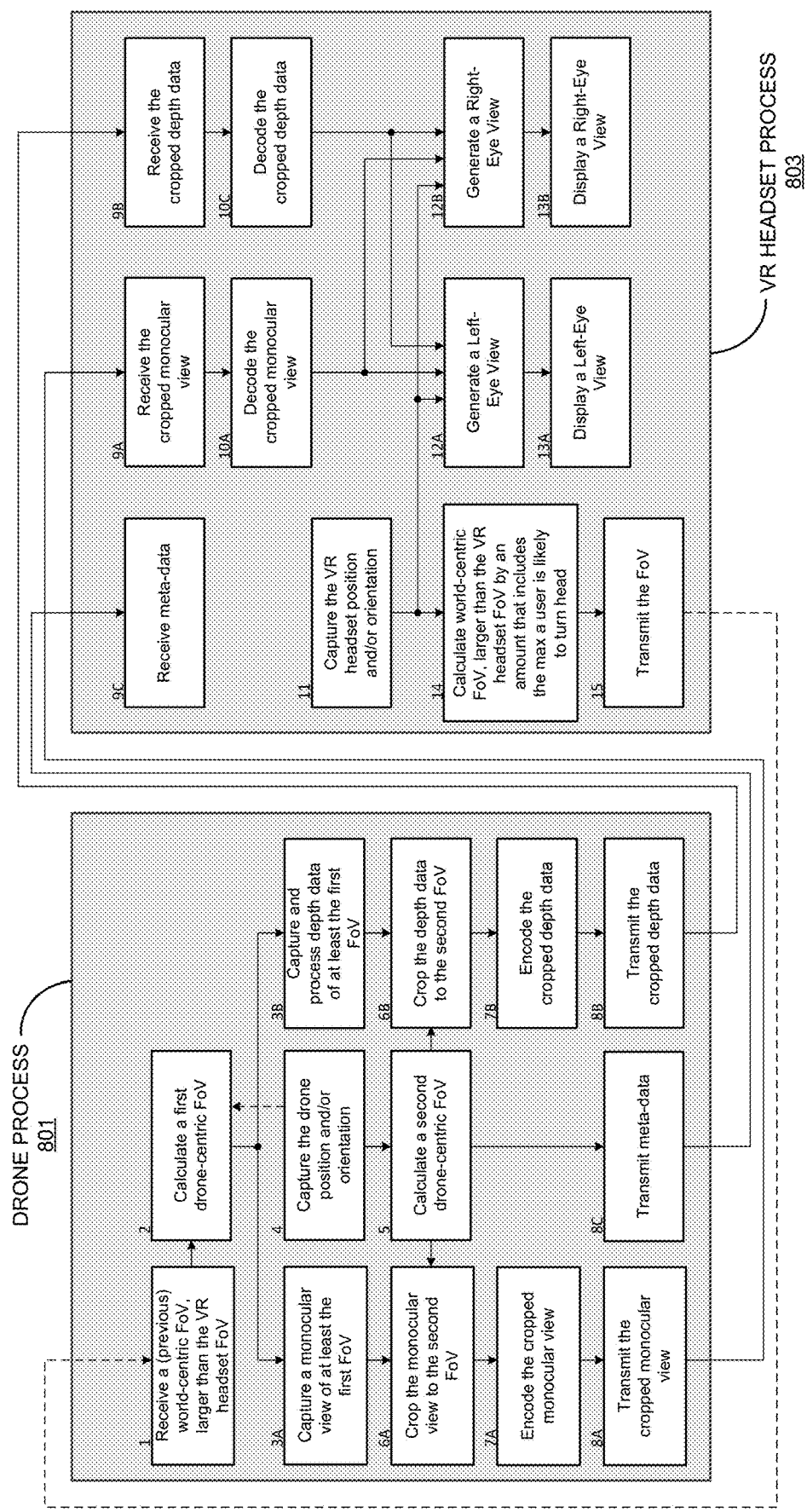
FIG. 8 is a block diagram illustrating an example of processes performed by a receiver-controller device and a remote-controlled device, in accordance with some examples.

FIG. 8 is a block diagram illustrating an example of processes performed by a receiver-controller device and a remote-controlled device. An illustrative example is given of a drone as the remote-controlled device and a VR headset as the receiver-controller device. However, one of ordinary skill will appreciate that the process 801 can be performed by any type of remote-controlled device and that the process 803 can be performed by any type of receiver-controller device that incorporates motion data (e.g., changing orientations and/or positions). FIG. 8 represents one iteration (e.g., capture and generation of one video frame) of the drone process 801 and VR headset process 803. Data transmitted from a previous iteration is shown as a dashed line. In some examples, during initialization, steps 4, 11, 14, and 15 may be executed to generate the positions and/or orientations and the FoVs for later iterations. Drone operations not specific to VR, such as Electronic Image Stabilization, Rolling Shutter Correction, Obstacle Avoidance, are not shown in FIG. 8 and may run concurrently with the operations of the drone process 801 and/or the VR headset process 803.

At step 1 of drone process 801, the drone receives a previous world-centric FoV from the VR headset. As indicated by the dashed line, the previous world-centric FoV includes data determined during a previous iteration of the VR headset process 803 (at step 14 of the previous iteration of the VR headset process 803). The previous world-centric FoV is larger than the actual VR headset FoV by an amount that includes the maximum a user wearing the VR headset is expected to move his or her head within a roundtrip time, and, in some cases, by an amount necessary to electrically stabilize the drone's motion. Calculation of the previous world-centric FoV is described below with respect to step 14 of the VR headset process 803. World-centric, as used herein, refers to a FoV in world space using world coordinates (coordinates within the scene itself). For example, the VR headset itself has an orientation relative to a fixed point (e.g., the horizon or flat ground, gravity, or the like). The world-centric coordinates of the VR headset can include the orientation (and position in some cases) relative to the fixed point.

Figure 9A:
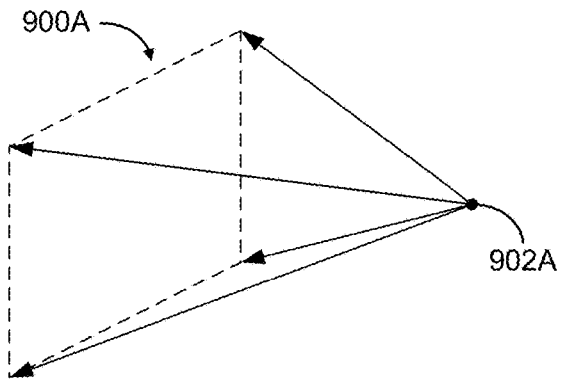
FIG. 9A is a diagram illustrating an example of a field of view, in accordance with some examples.
Figure 9B:
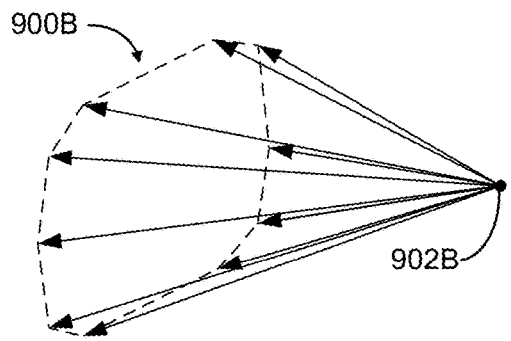
FIG. 9B is a diagram illustrating another example of a field of view, in accordance with some examples.

At step 2 of drone process 801, the drone calculates a first drone-centric FoV. For example, the previous world-centric FoV is combined with a previous drone position and orientation (determined at step 4) to generate the first drone-centric FoV. In some implementations, an FoV may be represented by a camera-position and a set of directional vectors describing the rays at the boundary of the FoV. In some implementations, an FoV may be rectangular and the set of vectors may include 4 vectors representing the four corners of the FoV. An example of such a rectangular FoV is illustrated in FIG. 9A, which shows an FoV 900A defined by one point 902A and a set of 4 direction vectors. In some implementations, a larger set of vectors may describe non-rectangular shaped FoVs, allowing the system to describe the minimal FoV as necessary to reconstruct the image. FIG. 9B shows an example of an arbitrary shaped (non-rectangular) FoV 900B defined by one point 902B and a larger set of direction vectors. The arbitrary shaped FoV 900B may more tightly represent the predicted FoV than a rectangular shaped FoV.

In some examples, a world-centric FoV may represent a position and orientation using latitude, longitude, and height relative to the geoid (in these example, step 4 may utilize a GPS process or other suitable process). In some other examples, a world-centric FoV may represent a position and orientation relative to an arbitrary stationary position and orientation, such as the position and orientation from which the drone was launched (in these examples, step 4 may utilize a Visual-Inertial-Odometry process or other suitable process).

A drone-centric FoV may represent a position and orientation relative to the body and heading of a drone. At step 2, a world-to-drone transform may be calculated such that a world-centric position Pw is transformed to a drone-centric position Pd by a translation T and Rotation Rx, Ry, Rz as follows:

$$P_d = R_{dz}(\theta_d) \cdot R_{dy}(\beta_d) \cdot R_{dx}(\alpha_d) \cdot T_d \cdot P_w \quad \text{Equation (1)}$$

Likewise, a world-centric directional vector may be transformed by Rotation Rx, Ry, Rz as follows:

$$D_d = R_{dz}(\theta_d) \cdot R_{dy}(\beta_d) \cdot R_{dx}(\alpha_d) \cdot D_w \quad \text{Equation (2)}$$

In matrix form, translation T and Rotation Rx, Ry, Rz matrices may be:

$$T = \begin{bmatrix} 1 & 0 & 0 & -x_d \\ 0 & 1 & 0 & -y_d \\ 0 & 0 & 1 & -z_d \\ 0 & 0 & 0 & 1 \end{bmatrix} \text{ for } \quad \text{Equation (3)}$$

done world-centric position $(x_d, y_d, z_d)$.

$$R_{dx}(\alpha_d) = \begin{bmatrix} 1 & 0 & 0 & 0 \\ 0 & \cos\alpha_d & -\sin\alpha_d & 0 \\ 0 & \sin\alpha_d & \cos\alpha_d & 0 \\ 0 & 0 & 0 & 1 \end{bmatrix}, \quad \text{Equation (4)}$$

$$R_{dy}(\beta_d) = \begin{bmatrix} \cos\beta_d & 0 & \sin\beta_d & 0 \\ 0 & 1 & 0 & 0 \\ -\sin\beta_d & 0 & \cos\beta_d & 0 \\ 0 & 0 & 0 & 1 \end{bmatrix},$$

$$R_{dz}(\theta_d) = \begin{bmatrix} \cos\theta_d & -\sin\theta_d & 0 & 0 \\ \sin\theta_d & \cos\theta_d & 0 & 0 \\ 0 & 0 & 1 & 0 \\ 0 & 0 & 0 & 1 \end{bmatrix} \text{ for }$$

done world-centric orientation $(\alpha_d, \beta_d, \theta_d)$.

In some implementations, other mathematic representations, such as Quaternions, may be used.

The first drone-centric FoV is mapped into a first image region that is used to determine a view that will be captured by one or more capture devices on the drone. The first drone-centric FoV is a sub-region within the full FoV of the one or more capture devices. In some cases, the first drone-centric FoV can correspond to the FoV 450 shown in FIG. 4. In other cases, a second drone-centric FoV (determined in step 5 below) can correspond to the FoV 450.

The world-centric FoV is converted or reoriented to the drone-centric FoV due to characteristics of a drone as it is maneuvered. For example, a drone tilts forward and backward as it accelerates, flies forward, and decelerates, causing one or more cameras on the drone to tilt and no longer point in the direction at which the drone is flying. If such a camera orientation were not accounted for, a user viewing the camera images in the VR headset would be looking at the ground instead of straight ahead where the drone is flying (level to the flat ground or horizon). In addition, a drone can bank (or tilt) to one side as the drone turns.

As noted above, the world-centric FoV provided to the drone indicates how the VR headset is oriented relative to a fixed point, such as the horizon. Because the drone is tilted forward and/or to the side, the orientation of the drone is not the same as the world-centric FoV orientation. Converting or reorienting the world-centric FoV to the drone-centric FoV includes taking the FoV coordinates relative to the reference plane (e.g., the flat ground or horizon) and converting the coordinates relative to the drone's tilt and/or bank angle, essentially subtracting the banking and/or tilting. Such conversion or reorientation to the drone-centric FoV compensates for the tilting and/or banking, allowing an image to be captured that is level with the reference point (e.g., the flat ground or horizon).

In some examples, the drone-centric FoV is further converted to a camera-centric FoV. For example, in some cases, a camera may be mounted to the drone with an offset position and orientation relative to the drone's chassis. For instance, the camera may not be mounted at the center of the drone, and instead may be mounted at the front of the drone or other place on the drone so that there is a translational offset. In drones with mechanical gimbals, the camera offset position and orientation may be a function of the gimbal orientation. In such examples, the FoV of a camera on the drone may not be aligned with the direction the drone is facing. For instance, the camera may be mounted such that it is pointed down at an angle relative to the direction the drone is pointed. In some implementations, the drone-centric FoV can be converted to a camera-centric FoV to compensate for the FoV of the camera relative to the FoV of the drone. For example, the drone-centric FoV may be transformed into the camera-centric FoV using equations similar to the equations (1)-(4) described above, for a camera of position $(x_c, y_c, z_c)$ and orientation $(\alpha_c, \beta_c, \theta_c)$ relative to the drone's chassis or other reference point on the drone. In some cases, the drone can use the extrinsic parameters of its camera to transform from the drone-centric FoV to the camera-centric FoV.

Further, in some implementations, the camera-centric FoV can be further converted to an image-centric FoV. A camera-centric FoV may be transformed into an image-centric FoV, whereby the camera to image transform accounts for perspective projector, transformation between camera frame and pixel coordinates, and geometric distortion of the lens. A set of direction vectors for an FoV may be normalized in their z-component and converted into pixel units:

$$\frac{x}{z} = -(x_i - o_x)s_x \text{ and} \quad \text{Equation (5)}$$

$$\frac{y}{z} = -(y_i - o_y)s_y \text{ for image center } (o_x, o_y)$$

and scale $(s_x, s_y)$.

The lens distortion can be corrected using the Zhang camera model:

$$x_i = x_d(1 + k_1 r^2 + k_2 r^4) \text{ and } y_i = y_d(1 + k_1 r^2 + k_2 r^4) \quad \text{Equation (6)}$$

Each direction vector of a set of direction vectors of an FoV may be transformed to calculate pixel positions of the corresponding boundary points (e.g. corners if the FoV is rectangular in shape) of an image-centric FoV. Since lens distortion may transform a straight boundary into a curved boundary, additional direction vectors may be interpolated between adjacent direction vectors of a set, and their pixel positions calculated. The camera-centric FoV may then be defined as the convex bounds of the transformed direction vectors.

Figure 9C:
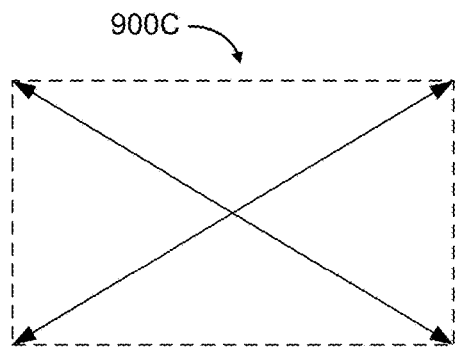
FIG. 9C is a diagram illustrating an example of a camera-centric field of view, in accordance with some examples.
Figure 9D:
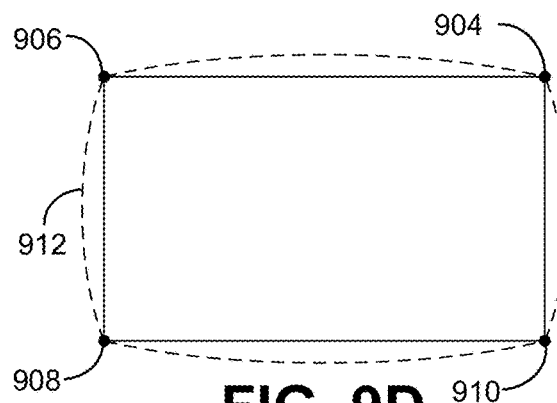
FIG. 9D is a diagram illustrating an example of camera-centric points of a camera-centric field of view, in accordance with some examples.
Figure 9E:
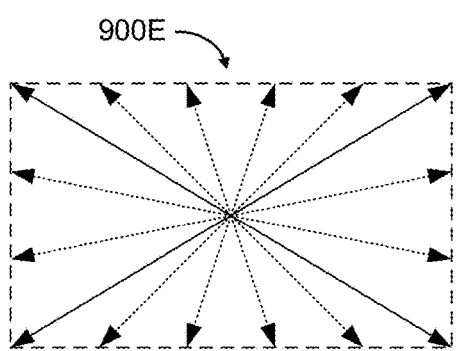
FIG. 9E is a diagram illustrating an example of a camera-centric field of view, in accordance with some examples.
Figure 9F:
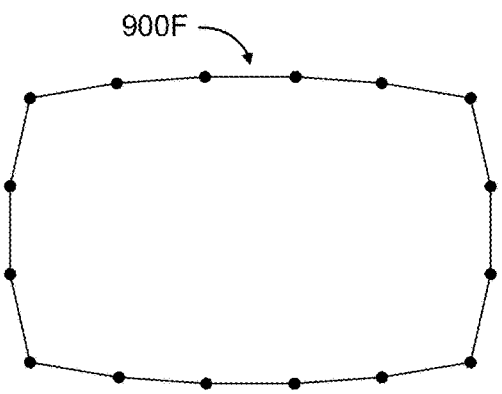
FIG. 9F is a diagram illustrating an example of camera-centric points of a camera-centric field of view, in accordance with some examples.

FIG. 9C illustrates an example of a camera-centric FoV 900C, which is aligned to the x-y plane. A rectangular camera-centric FoV 900C may transform into a non-rectangular image-centric region boundary 912 due to lens distortion. If a camera to image transform were to only transform the four vectors of camera-centric FoV 900C into the four image-centric points 904, 906, 908, 910 shown in FIG. 9D, the resulting image boundary would be rectangular and may not adequately account for lens distortion. In order to account for lens distortion, additional direction vectors may be interpolated between adjacent direction vectors of a camera-centric FoV. FIG. 9E illustrates a camera-centric FoV 900E comprised of the set of vectors of 900C and additional interpolated vectors. Camera-centric FoV 900E is transformed by a camera to image transform, generating image boundary 900F shown in FIG. 9F. Notice that image boundary 900F more accurately represents the non-rectangular image boundary 912 necessary to properly represent the FoV due to lens distortion. Although these examples use an FoV defined by a set of 4 direction vectors, it should be understood that it applies to FoVs defined by larger sets of direction vectors.

As described above, the first drone-centric FoV is mapped into a first image region. In some cases, the first image region can include the image region corresponding to the FoV 450 shown in FIG. 4. At step 3A of drone process 801, the drone can use one or more image capture devices (e.g., one or more cameras) to capture a monocular view (color image) of at least the first image region. In some cases, the drone may include multiple cameras, in which case the cameras necessary to capture the first image region corresponding to the first drone-centric FoV can be selected, and the views of multiple cameras can be stitched together to form the necessary image data to capture the first image region.

At step 4, one or more location sensors of the drone can be used to capture a new drone position and/or orientation representing the drone position and/or orientation at the time of monocular view capture (step 3A) or depth data capture (step 3B, described below). As previously described, a drone position and orientation may be calculated using a Visual Inertial Ordometry algorithm, utilizing gyroscope data, accelerometer data, image data, ultrasonic range sensor data, or any suitable combination thereof. The gyroscope data, accelerometer data, image data, and/or the ultrasonic range sensor data may be sampled at the time of monocular view capture (step 3A) or depth data capture (step 3B). Alternatively, the new drone position and/or orientation may be interpolated from drone positions and orientations prior to and after the time of monocular view capture (step 3A) or depth data capture (step 3B).

At step 5, the drone calculates a second drone-centric FoV based on the new drone position and/or orientation. For example, the previous world-centric FoV can be combined with the new drone position and/or orientation to generate the second drone-centric FoV. The second drone-centric FoV is mapped into a second image region. The second drone-centric FoV is a sub-region within the FoV of the one or more capture devices. In some cases, the second image region can include the image region corresponding to the FoV 450 shown in FIG. 4. Updating the image region to correspond to a more recent position and/or orientation of the drone allows the captured image data to more accurately reflect the view of the drone. In some implementations, the drone does not calculate a second drone-centric FoV based on the new position and/or orientation, in which case the first drone-centric FoV can be used in steps 6A and 6B. In some cases, as described below, lens distortion can be accounted for, and the image region can be padded to provide extra area that may be needed by electronic image stabilization.

At step 6A, the drone crops the monocular view to the second drone-centric image region corresponding to the second drone-centric FoV. In implementations in which only the first drone-centric image region is used, the drone can crop the monocular view to the first drone-centric image region. The cropped monocular view can correspond to the cropped image 500 shown in FIG. 5. By cropping the image data, a greater portion of the available bitrate may be used to encode the portion of the captured view that is eventually displayed by the VR headset, thereby maximizing the encoded image quality. In some implementations, as described in more detail below, step 6A may include spatially de-warping the view within the second drone-centric FoV to produce a rectangular image suitable for encoding using standard video compression standards. In some implementations, as described in more detail below, step 6A may include masking the portion of the second image region that is not within the second drone-centric FoV in order to minimize the encoded data rate of image pixels that are not needed.

At step 3B, the drone captures depth data (e.g., using one or more depth sensors) of at least the second image region corresponding to the second FoV and processes the depth data. As described above with respect to FIG. 1, the drone can include one or more depth sensors, including one or more stereo camera pairs, time-of-flight sensors, structured light sensors, or a combination thereof. In some implementations, step 3B may further include selecting the depth sensors necessary to capture the first drone-centric FoV, and stitching the depth data of multiple depth sensors. In one illustrative example, a drone having four depth sensors, each observing a 90 degree FoV, may require three depth sensors (capturing a total 270 degree FoV) to capture a specific 180 degree FoV.

At step 6B, the drone crops the depth data to the second image region. In some cases, as noted above, only the first drone-centric FoV is used, in which case the depth data is captured based on the first image region, and the depth data is cropped to the first image region. Cropping the depth data may further reduce the data that must be encoded and transmitted to the VR headset. In some implementations, as described in more detail below, step 6B may include spatially de-warping the depth data within the second drone-centric FoV to produce a rectangular image suitable for encoding. In some implementations, as described in more detail below, step 6B may include masking the portion of the second image region that is not within the second drone-centric FoV in order to minimize the encoded data rate of image pixels that are not needed.

At step 7A, the drone encodes the cropped monocular view (e.g., using an encoder device 110). At step 7B, the cropped depth data is encoded (e.g., using an encoder device 110). The cropped monocular view and the cropped depth data can be encoded using any suitable video coding standard (e.g. H.256, H.265, H.264, or other suitable video coding standard). In some examples, disparity data (from stereo cameras) or depth data (from any type of depth sensor) may be mapped to luminance values for encoding using standard video compression standards. The mapping may be non-linear, since depth sensors may provide more precise measurements of nearby depths than far depths, and the precision of nearby depths have a greater visual impact on the generated Left-Eye and Right-Eye Views (generated in steps 12A and 12B) than far depths. In some cases, the depth data may be of lower resolution and lower frame rate than the monocular view. In one illustrative example, the drone may be able to encode a ultra-high definition stream plus a lower resolution stream.

At step 8A, the drone transmits the encoded monocular view (e.g. using a communication interface 112). At step 8B, the drone transmits the encoded depth data. Steps 3B, 6B, 7B, and 8B can be performed sequentially or concurrently (in parallel) with one or more of the steps described above (e.g., with steps 3A, 6A, 7A, 8A). For example, the drone can transmit the encoded monocular view and the encoded depth data at the same time, in the same bitstream, and/or the like.

At step 8C, meta-data can be transmitted in some implementations. Meta-data may include data describing fish-eye lens distortion, such as the intrinsic camera parameters, or alternatively, a correction matrix. Additionally or alternatively, meta-data can include Electronic Image Stabilization data, such as drone motion data, or alternatively, a correction matrix. Additionally or alternatively, meta-data can include data describing the second drone-centric FoV (or the first drone-centric FoV when a second drone-centric FoV is not used). Additionally or alternatively, meta-data can include data describing the drone model and mode of operation. Additionally or alternatively, meta-data can include data describing altitude of the drone, obstacles in the environment, or other suitable information.

The VR headset process 803 includes receiving the cropped monocular view at step 9A, receiving the cropped depth data at step 9B, and receiving the meta-data (if included) at step 9C. The process 803 includes decoding (e.g., using decoder device 118) the cropped monocular view at step 10B, and decoding (e.g., using decoder device 118) the cropped depth data at step 10B. The cropped monocular view and cropped depth data can be decoded using any suitable video coding standard.

At step 11, the VR headset process 803 includes capturing or determining a new VR headset orientation and/or position (e.g., using one or more location sensors 121). The new VR headset orientation and/or position can correspond to an actual orientation and/or position (also referred to herein as an actual orientation and/or position) of the VR headset when step 11 is performed. For example, in order to minimize the "motion to photon" latency, a more recently sampled headset orientation is used for the steps that follow, rather than the headset orientation that was used to calculate the previous world-centric FoV for capturing the images and data on the drone. Because the cropped image data (the cropped monocular view and depth data) includes an image region (e.g., FoV 450 in FIG. 4) that encompasses more than the world-centric FoV from a prior iteration by an amount a user is estimated to move his or her head, the more recently sampled headset orientation will be included in the cropped image data. For example, the new FOV 652, 654 shown in FIG. 6 is within the cropped image 500.

At steps 12A and 12B, the VR headset generates Left-Eye and Right-Eye views using the new VR headset orientation and position, the decoded monocular view, and the decoded depth data. In some examples, a single image view can be generated instead of Left-Eye and Right-Eye views. For example, a single image view can be rendered for display on a single screen, such as a mobile device display, a television display, a wearable device display, or other suitable single-screen display.

Examples of a Left-Eye view and a Right-Eye view are shown in FIG. 7A and FIG. 7B, respectively. Any suitable technique for generating stereo views using a monocular image, depth data, and location information (e.g., VR headset orientation and/or position) can be used to generate the Left-Eye and Right-Eye views. In one illustrative example, stereo views may be generated utilizing a monocular image and depth data. For example, the depth data can be transformed into disparity data, whereby the disparity represents a horizontal displacement of each pixel. In some implementations, the Left-Eye and Right-Eye views may be generated as the monocular image displaced by plus or minus (+/−) half the disparity at each pixel position. In some other implementations, the monocular image may be displayed as the Left-Eye view, and the Right-Eye view may be generated as the monocular image displaced by the disparity at each pixel position. Similarly, the monocular image may be displayed as the Right-Eye view, and the Left-Eye view may be generated as the monocular image displaced by the disparity at each pixel position. In some cases, the depth data may be of lower special resolution than the monocular image. In such cases, the depth data may be upscaled. Upscaling may utilize the monocular image. In some examples, upscaling may utilize the monocular image by processing a superpixel algorithm on the monocular image to generate a segment within the monocular image corresponding to each element of the depth data, where each segment's bounds follows the contours of the monocular image.

In some examples, steps 12A and 12B may include cropping and warping the view received from the drone by a transform to replicate a different orientation and position as the original image was captured, and warping the view image by a disparity based on the depth data to synthesize the eye's unique viewpoint. For example, an eye's viewpoint may see objects occluded by nearer edges in the monocular camera's viewpoint, which may be filled in by blending the surrounding data. This is anticipated to have a minimal effect on the user experience given that, during typical drone flight, objects are significantly far away relative to intraocular distances. The VR headset displays the Left-Eye and Right-Eye views at steps 13A and 13B (e.g., using display device 122).

At step 14, the AR headset calculates a new world-centric FoV that is larger than the actual VR headset FoV determined using the captured new VR headset orientation and/or position. The new world-centric FoV is transmitted by the VR headset to the drone at step 15, and is used as the "previous" world-centric FoV in the next iteration of the processes 801 and 803. In some cases, the new world-centric FoV is larger than the actual VR headset FoV by an amount that includes the maximum a user is likely to turn their head within a roundtrip time. In some cases, the new world-centric FoV may be additionally larger by an amount necessary to compensate for the maximum a user is expected to move their head within the roundtrip time, and an amount necessary to electrically stabilize the drone's motion.

The maximum a user is likely to move their head within the roundtrip time may be calculated or estimated based on various factors or constraints. For example, factors can include and constraints can be based on: a human kinematic model; the current position, velocity, and acceleration of the user's head; the limits of velocity and acceleration of a typical human, the expected velocity and acceleration of a classification of operator (e.g. professional, child), other suitable factors, or any combination thereof. In some examples, the maximum a user is likely to move their head may be calculated based on prior observations of the user's head motion, based on the drone's state (e.g. altitude, proximity to obstacles, or other state or status), the drone's mode of operation (e.g. being used for photography, being used for sport or acrobatics, being used in a race mode, or other mode), the drone's model or design (e.g. drone model is designed principally for photography, for sport, for racing, or the like), or any combination thereof. Additional details of such factors are discussed further below.

Figure 10:
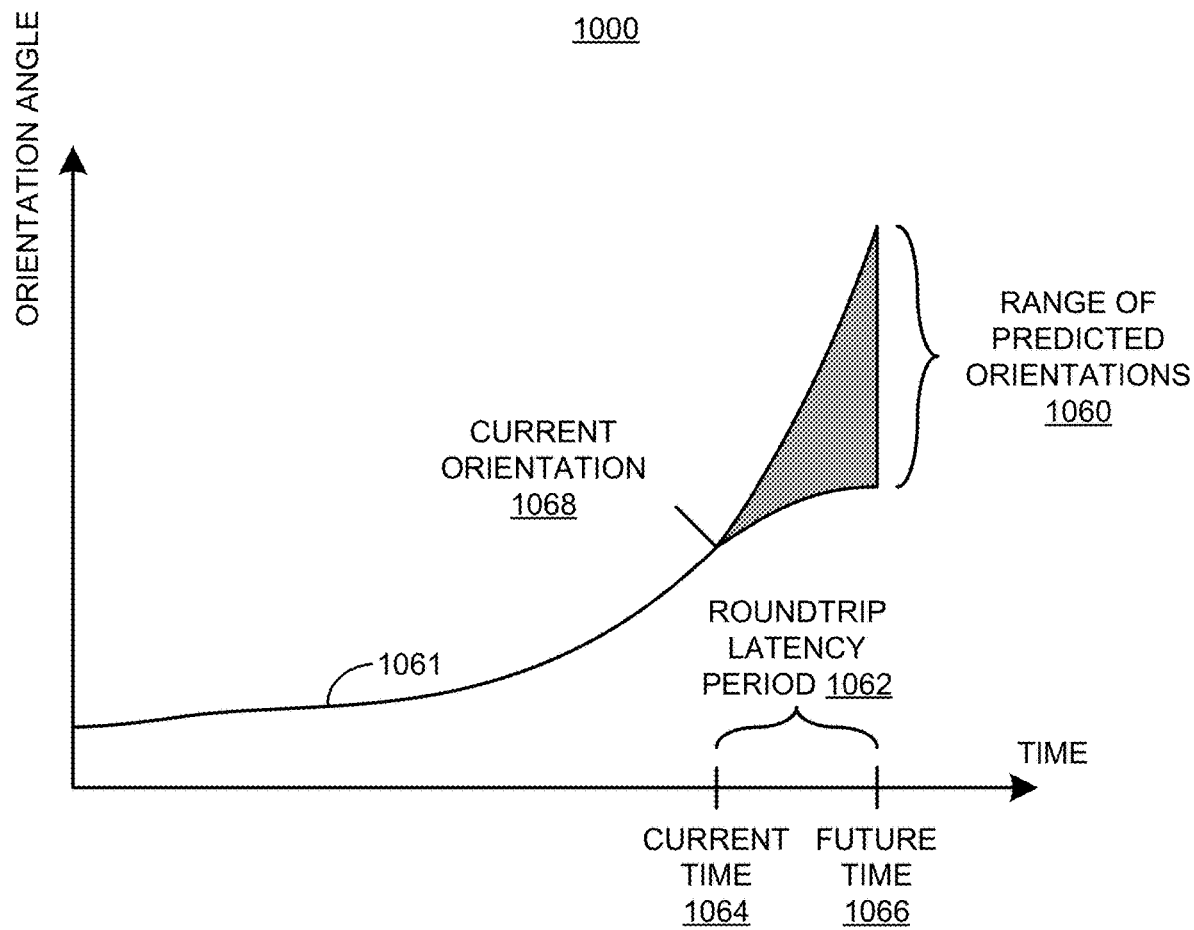
FIG. 10 is a diagram illustrating an example of a range of predicted orientations of a user's head during a roundtrip latency time period, in accordance with some examples.

FIG. 10 is a graph 1000 illustrating an example of a range of predicted orientations 1060 of the VR headset (corresponding to orientations of the user's head) during a roundtrip latency time period 1062. The range of predicted orientations 1060 represents the maximum a user is likely to move their head within the roundtrip time period 1062. In some implementations, the range of predicted orientations 1060 can also include a range of predicted positions of the headset (corresponding to positions of the user's head) in addition to the orientations of the headset. The range of predicted orientations 1060 can be determined during step 14 of FIG. 8 when the world-centric FoV of the drone is calculated. For example, the world-centric FoV can be calculated so that it is larger than the actual VR headset FoV by an amount that includes all possible orientations (and positions in some cases) of the range of predicted orientations 1060 (e.g., the FoV 450 shown in FIGS. 4 and 5 that is used to crop the full camera view of the drone). Calculating the world-centric FoV taking into account the range of predicted orientations 1060 is key to efficiently utilizing the bandwidth for transmitting the FPV video stream with the image data from the drone to the VR headset. Bandwidth for the FPV video stream is typically limited at the distances a drone is expected to fly from the remote controller, so it is beneficial to transmit the minimal FoV necessary (e.g., the cropped image 500 of FIG. 5 including the FoV 450) to generate the images on the VR headset.

At step 14, calculating the world-centric FoV may include predicting a range of predicted orientations 1060 and/or positions of the VR headset during the roundtrip latency period 1062, which includes predicted orientations and/or positions between a current time 1064 and a future time 1066. The world-centric FoV can be made to be larger than the actual FoV of the drone by an amount equal to the additional FoVs required to encompass the range of predicted orientations 1060. In some cases, the current time 1064 can include the time at which the VR headset position and/or orientation (e.g., the current orientation 1068) is captured at step 11. One of ordinary skill will appreciate that the current time 1064 can be some time other than the time at which the current orientation 1068 (and position in some cases) is captured, such as when the world-centric FoV is sent to the drone, or other suitable time. The future time 1066 can be determined as the current time 1064 plus the roundtrip latency period 1062. The roundtrip latency period 1062 can be known. For example, the roundtrip latency period 1062 can include the time from when the drone captures the orientation and/or position data (at step 11) to when the drone decodes, renders, or displays the image data from the drone (e.g., the stereo images 700A and 700B). Calculating the world-centric FoV can further include calculating a minimum size rectangular image (or other suitable shape) region that encompasses the range of predicted orientations 1060. An example rectangular region can include a rectangular region corresponding to the FoV 450 shown in FIG. 4.

Head movement of a user of the VR headset can be modeled to better understand how to crop the view transmitted to the VR headset. In some examples, as noted previously, predicting the range of predicted orientations 1060 and/or positions of the VR headset may be calculated based on various factors and/or constraints. For example, the range of predicted orientations 1060 can be predicted using a human kinematic model. This calculation may include the current orientation 1068 of the headset at the current time 1064, the current angular velocity of the headset, and a rate of acceleration and deceleration in angular acceleration of the headset. For example, it can be assumed that a user that is currently rotating their head (as shown by the upward trend of the line 1061 and the current orientation 1068 in FIG. 10) will likely continue to rotate their head. While the angular velocity of the user's head rotation may accelerate or decelerate during the roundtrip latency period 1062 (resulting in the range of predicted future orientations 1060), the user's head is unlikely to instantaneously stop or spontaneously change orientation. Based on this human kinematic model, the head orientation (and thus the VR headset orientation) is unlikely to be outside of the range of predicted future orientations 1060 during the roundtrip latency period 1062, barring an external force.

In some implementations, constraints can also be used for modeling the head movement. For instance, the constraints may be taken into account when calculating the range of predicted orientations 1060 of the headset. Various examples of constraints are given below. The constraints can be used individually or in any suitable combination. One or more of the constraints can be pre-programmed and static, while one or more other constraints can be dynamically updated as more data is obtained.

In some examples, constraints may include limits on orientation, position, velocity, acceleration, and deceleration based upon limits of a typical human's motion. For instance, the actual orientation of a head being modeled (e.g., the head of the user wearing a VR headset) may be constrained by the maximum a typical human can tilt his or her head. In one illustrative example, a typical human can tilt his or head back so that the forehead is pointed approximately 90° relative to the horizon (or flat ground), can tilt his or head down so that the forehead is pointed approximately −90° relative to the horizon, and can rotate his or head to the side at approximately 90° relative to a forward direction. One or more constraints can be defined that limit the range of predicted orientations 960 to be within such a limited ranges of degrees (e.g., between −90° and 90° in any direction). Similarly, the actual position, velocity, acceleration, and deceleration of a head being modeled may be constrained by the maximum a user can move their head according to the different characteristics. For instance, the maximum velocity and acceleration at which a human is known to move their head can be used to limit the range of predicted orientations 1060.

In some examples, constraints may include predefined limits of user head motion based upon a drone's mode of operation (e.g., beginner, normal, sport, or other suitable mode of operation) and/or model (e.g., drone model is designed principally for photography, sports, acrobatics, racing, or other purpose). In one illustrative example, given a drone model designed principally for photography and operated in normal mode, it may be expected that a typical user of such a drone may turn his or her head to observe scenery, and therefore may turn his or her head relatively slowly. Given the expected slow head movement, the range of predicted future orientations 1060 during the round-trip latency period 1062 can be smaller than if faster head movement were predicted (e.g., for a sport or racing model) due to less head movement being predicted. In another illustrative example, given a drone model designed principally for racing and operated in sport mode, it may be expected that a typical user may turn his or her head relatively quickly to view rapidly approaching obstacles, course variations, and other drones that may be racing. The range of predicted orientations 1060 during the round-trip latency period 1062 can be larger for such models to accommodate more possible head orientations.

In some cases, constraints may include limits of user head motion based upon the drone's status or state, such as altitude, proximity to obstacles or other drones, or other location based information. In one illustrative example, if the drone is at a high altitude and is moving at a low velocity, the head model can assume that the user is looking around at scenery and thus not turning his or her head very quickly or very often. In another example, if the drone is close to the ground or descending rapidly as if the user is landing the drone, the user is likely going to look around for obstacles and for a place to land. In another illustrative example, a drone can be fitted with sensors to detect obstacles. The drone may determine the drone's proximity to obstacles, and may communicate that proximity to the VR headset. The VR headset may anticipate head movement based on the proximity to obstacles, and may determine the range of predicted orientations 1060 accordingly. For instance, when flying a drone near an obstacle, it may be expected that a typical user may turn his or her head relatively quickly to look for alternative trajectories, or switch rapidly between looking at an obstacle to looking at a clear path. Based on the expected high amount of head movement, the range of predicted orientations 1060 during the round-trip latency period 1062 can be larger to accommodate more possible head orientations.

In some examples, constraints may include limits on user head motion based upon prior observations of user head motion. For example, the VR headset can learn user behavior and use the learned behavior to determine the range of predicted orientations 1060. In one illustrative example, a user who has been observed frequently moving his or her head quickly in the past may be expected to move his or her head quickly in the future. In some implementations, the VR headset can track how much the current user has moved their head since they started flying the drone. The tracked movement can be stored (e.g., locally on the VR headset or remotely, such as in a remote storage device, cloud storage, or other suitable remote storage) in a history along with data from prior sessions. For instance, it can be determined from a user's history that the user flies the drone one week in a certain mode and then the next week in the same mode. Using such a determination, a constraint can be added that the user is going to fly the drone in the same mode, and thus a range of predicted orientations 1060 can be determined according to the prior observations and the mode of operation.

By dynamically determining the range of predicted orientations 1060 based on various constraints, the world-centric FoV and encoding quality can be dynamically adjusted according to the range of predicted orientations 1060. In some cases, the world-centric FoV can be narrowed, in which case less video data (a smaller cropped region) has to be encoded and transmitted from the drone to the VR headset. For example, when smaller world-centric FoV is determined based on a smaller range of predicted orientations 1060, a smaller image region can be cropped and sent to the VR headset by the drone. With less data that has to be encoded, higher quality image data can be provided for display on the VR headset. In some cases, the world-centric FoV can be made larger, requiring more data (a larger cropped region) to be encoded and transmitted from the drone to the VR headset.

In one illustrative example, the world-centric FoV and encoding quality can be adjusted based on the use of the drone. For example, when using a racing drone, a user is less concerned about the image quality as they are about the speed and viewable area. As noted above, a user of a drone model designed for racing may be expected to turn his or her head relatively quickly, and the range of predicted orientations 1060 during the round-trip latency period 1062 can be made larger for such models to accommodate more possible head orientations. Because speed and viewable area are more of a priority than image quality, the larger range of predicted orientations 1060 is acceptable, as the drone can encode a larger area (based on a large world-centric FoV due to a large range of predicted orientations 1060) at a lower image quality so that the user can have a larger area to view. In another example, when using a drone for photography, a user wants to look around a scene, but at a less rapid pace than if racing the drone. The range of predicted orientations 1060 during the round-trip latency period 1062 can be made smaller due to less possible head orientations. In such an example, the drone can crop and encode a smaller FoV at a higher quality by eliminating video compression artifacts and the like.

In some implementations, a VR headset can calculate a world-centric FoV by predicting the probability of orientations and/or positions of the user's head for a future time, and can calculate the minimum size rectangular image region that encompasses a threshold sum of probabilities of orientations and positions. Predicting a probability of orientations and positions of the user's head for a future time may be calculated based on a human kinematic model and include constraints similar to those described above.

In some cases, various characteristics of an image capture device (e.g., a camera, image sensor, or the like) can distort the captured images. Such distortion needs to be corrected for by the remote-controlled device (e.g., drone or other device) or by the receiver-controller device (e.g., VR headset or other receiver-controller device) when generating Left-Eye and Right-Eye views for display. As noted previously, the camera-centric FoV can be converted to an image-centric FoV in some cases to correct for distortion in the images. In some examples, the camera-centric FoV can be converted from a camera-centric FoV to an image-centric FoV by accounting for lens distortion and/or by performing image stabilization.

Figure 11C:
FIG. 11C includes a diagram illustrating an example of a de-warped image, in accordance with some examples.
Figure 11B:
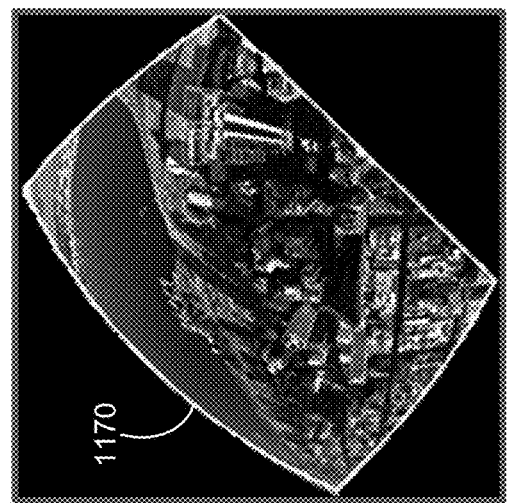
FIG. 11B includes a diagram illustrating an example of a cropped and masked image, in accordance with some examples.
Figure 11A:
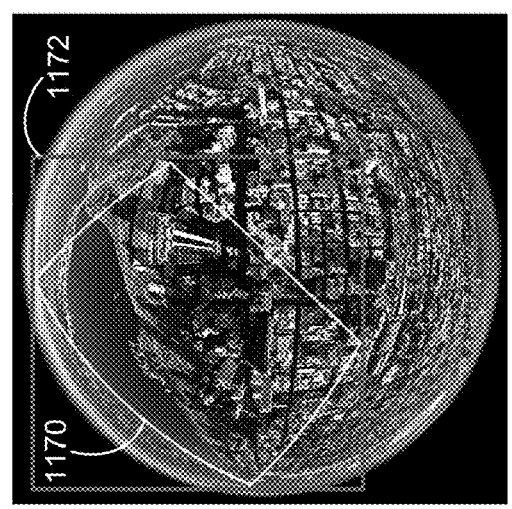
FIG. 11A includes a diagram illustrating an example of a fish-eye image, in accordance with some examples.

A remote-controlled device (e.g., drone or other device) can include a camera with a fish-eye lens so that captured images include fish-eye images. FIG. 11A shows an example of a fish-eye image 1100A. A fish-eye lens provides an approximately 180° camera FoV. As noted above, the first drone-centric FoV (calculated in step 2) and the second drone-centric FoV (calculated in step 5) are both sub-regions within the camera FoV, and are based on the position and/or orientation of the remote-controlled device at a given instant in time.

In some cases, fish-eye lenses have significant geometric lens distortion that must be corrected. For instance, a FoV captured by a fish-eye camera may need to be converted from a camera-centric FoV to an image-centric FoV by correcting for the lens distortion of the fish-eye images. Correcting the geometric distortion may include geometrically de-warping the camera image. As shown below in FIG. 11A-11C, to correct for the lens distortion of a fish-eye image, an image region box (image region 1172) can be determined that includes the distorted barrel-type shape of the FoV in the fish-eye image (drone-centric FoV 1170), which can then be used to de-warp the camera image. Generating Left-Eye and Right-Eye views (Steps 12A-12B) also includes geometrically de-warping an image. In some embodiments, de-warping to correct for lens distortion be combined with generating Left-Eye and Right-Eye views because the de-warping process requires significant memory bandwidth, and de-warping twice could reduce the image quality. In such embodiments, step 5 of the drone process 801 includes calculating the second drone-centric FoV accounting for lens distortion.

In FIG. 11A, a fish-eye image 1100A is shown with a second drone-centric FoV 1170 (determined in step 5 of the drone process 801) and a second image region 1172 that the second drone-centric FoV 1170 is mapped into. FIG. 11B shows an example of a cropped and masked image 1100B. FIG. 11C shows an example of a de-warped image 1100C. The second drone-centric FoV 1170 is not rectangular. In some embodiments, step 5 of the drone process 801 can calculate a second image region 1172 that is rectangular. Step 6A can generate a cropped and masked image 1100B by cropping the captured image to the second image region 1172 and by masking the image within the second image region 1172 but outside of the second drone-centric FoV 1170 (as shown by the black background in image 1100B). Masking the image may include providing mask data to the encoding process (step 7A-7B). For example, the mask data may be a binary classification for each pixel (or each macro-block, coding tree unit, or other unit of video), classifying that pixel (or macro-block or other unit of video) as being included or excluded from the FoV. Those pixels (or macro-blocks or other unit of video) classified as being excluded from the FoV may be encoded as an arbitrary value, as they will not contribute to the generation of the Left-Eye and Right-Eye views. In some implementations, an arbitrary value is selected as to minimize the encoded data size. In some cases, masking the image may include altering the pixel values to simplify the encoding of those pixels (e.g. by changing them to black, or other suitable alteration). An image mask may be aligned with the macro-blocks, Coding Tree Units (CTUs), or other unit of video used by the encoding process. The cropped and masked image 1100B can then be sent to the VR headset.

In some cases, steps 12A and 12B of the VR headset process 803 can de-warp the portion of the image within the second drone-centric FoV 1170 to generate the de-warped image 1100C. For example, an image may be de-warped such that each pixel of the de-warped image is selected from a pixel at a displaced coordinate of the source image (e.g., the portion of the image within the second drone-centric FoV 1170). A displacement may include a fraction component to its coordinate, in which case a de-warped pixel value may be interpolated from the pixels neighboring the displaced coordinate. Some implementations may represent the displaced coordinates as texture coordinates within a mesh grid that may be processed by a GPU.

In some cases, the drone can de-warp the portion of the image before encoding and sending the de-warped image to the VR headset. As noted above, in some embodiments, de-warping to correct for lens distortion can be combined with generating Left-Eye and Right-Eye views so that de-warping is performed only once. Such a combined de-warping process can be performed due to the de-warping process requiring significant memory bandwidth, and de-warping twice could reduce the image quality. In some cases, de-warping by the VR headset and/or drone can be done by spatially de-warping the view within the second drone-centric FoV to produce a rectangular image. When the drone performs the de-warping process, the rectangular image is suitable for encoding. For illustrative purposes, the example shown in FIG. 11A-FIG. 11C shows only fish-eye lens distortion. However, it should be understood by one of ordinary skill that actual images may also include other artifacts that are de-warped. Also, for illustrative purposes, the example shown in FIG. 11A-FIG. 11C shows only a single de-warped image 1100C. However, it should be understood by one of ordinary skill that steps 12A and 12B of the VR headset process 803 can generate an image for each of two eyes (Left-Eye and Right-Eye images).

In some cases, an image capture device (e.g., camera, image sensor, or the like) or objects in a scene can move as images are captured, affecting the FoV of the captured images. Image stabilization can be performed to correct for image defects caused by such movement. For example, a drone's camera may be a rolling shutter camera. A rolling shutter camera captures each scanline at an offset time, which results in motion and vibration artifacts. Each image is captured sequentially with different portions of the image effectively being captured at different times. In one illustrative example, for a fast moving object, the top of the image is captured before the bottom of the image. If the camera is pointing to the side or the user is looking to the side, the items in the images appear to shear (as shown in image 1200A of FIG. 12A). In another illustrative example, when a drone is in motion, objects in the camera's view may move within the image between the time that one part of the sensor captures the image compared to the time that another part of the sensor captures the image, resulting in objects appearing stretched, compressed, sheared, or skewed. Such geometric distortion may be corrected for by expanding the FoV.

Figure 12B:
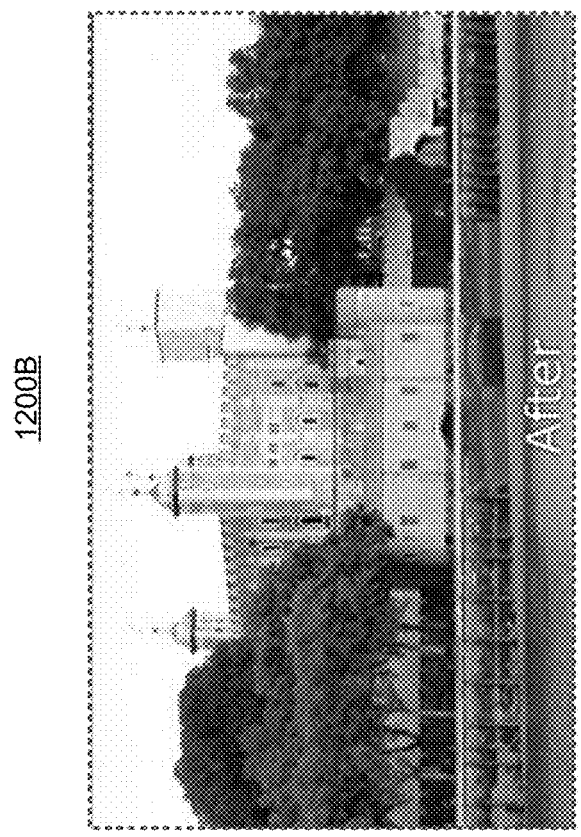
FIG. 12B includes a diagram illustrating an example of an image after image stabilization is performed, in accordance with some examples.
Figure 12A:
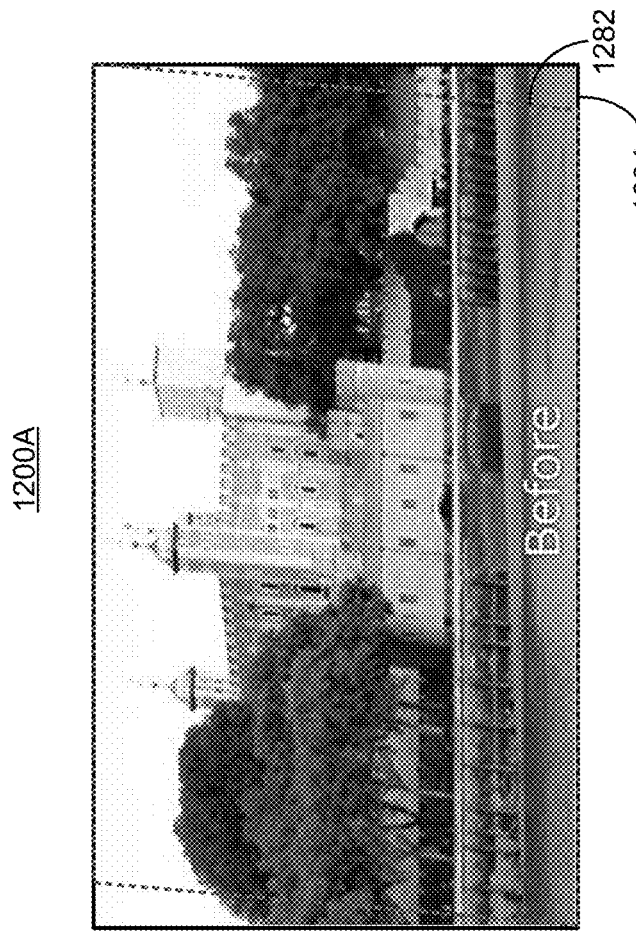
FIG. 12A includes a diagram illustrating an example of an image before image stabilization is performed, in accordance with some examples.

A process for electronically stabilizing a drone's image captured using a rolling shutter camera (or other camera with similar effects) may include: capturing the motion of the camera, such as by capturing inertia measurements using an accelerometer and/or gyroscope; calculating the motion of the camera, such as by calculating motion for multiple portions of the camera image; and geometrically de-warping the camera image to compensate for the motion of the drone's camera. As explained above, an image may be de-warped so that each pixel of the de-warped image is selected from a pixel at a displaced coordinate of the source image. FIG. 12A includes a diagram illustrating an example of an image before image stabilization is performed. FIG. 12B includes a diagram illustrating an example of an image after image stabilization is performed. In the example shown in FIG. 12A, the dotted box 1282 represents the image area necessary for correction of the distortion, while the larger box 1284 represents the expanded rectangular image area encompassing the dotted red box. As shown, the box 1282 (or region) that is captured is enlarged to accommodate the shearing. For illustrative purposes, the example shown in FIG. 12A and FIG. 12B only show rolling shutter motion artifacts. It should be understood that actual images may also include fish-eye lens distortion, rolling shutter vibration artifacts, or other distortions.

Generating Left-Eye and Right-Eye views (Steps 12A-B of the VR headset process 803) also require geometrically de-warping an image. In some embodiments, the de-warping portion of electronically stabilizing a drone's image can be combined with generating a Left-Eye and a Right-Eye view because the de-warping process requires significant memory bandwidth, and de-warping twice could reduce the image quality. In such embodiments, step 5 may further include calculating the motion of the drone's camera, and calculating the second image region (the image region that the second drone-centric FoV determined in step 5 of the drone process 801 is mapped into) further includes padding the image region by the amount necessary to electronically stabilize the image to correct for a drone's motion and vibration.

Figure 13:
FIG. 13 is a diagram illustrating another example of an image before image stabilization is performed, in accordance with some examples.

In some cases, an image capture device can vibrate as images are captured, affecting the FoV of the captured images. For example, with a rolling shutter camera, vibrations that are higher in frequency than the camera frame rate may cause the image to appear wavy. FIG. 13 is a diagram illustrating an example of an image 1300 (before image stabilization is performed) that is captured as a drone or the drone's camera vibrates. Correcting for geometric distortion caused by camera vibration can be done by expanding the FoV. In the example shown in FIG. 13, the distortion is highlighted by the dotted box 1386. In particular, the dotted box 1386 represents the irregular shaped image area necessary for correction of the distortion, while the larger box 1388 represents the expanded rectangular image area encompassing the dotted box 1386. For illustrative purposes, this example shows only rolling shutter vibration artifacts. It should be understood that actual images may also include fish-eye lens distortion, rolling shutter motion artifacts, or other distortions.

As noted above, generating Left-Eye and Right-Eye views (Steps 12A and 12B of the VR headset process 803) can include modifying the view to remove distortion and make the images viewable on the VR headset or other receiver-controller device. In some implementations, generation of the Left-Eye and Right-Eye views may include cropping and (de-)warping the view provided from the drone by a transform to correct for the camera's fish-eye lens distortion. For example a camera with a fish-eye lens may be used to capture a 180-degree field of view, and the image region transmitted to the VR headset may include that distortion. Generation of the Left-Eye and Right-Eye views may further include electronically stabilizing the image for drone motion and vibration, as described pertaining to Step 2. Generation of the Left-Eye and Right-Eye views may further include replicating a different orientation and position as that from which the original image was captured. For example, as described previously, the image region transmitted to the VR headset (e.g., image 500 shown in FIG. 6) corresponds to a predicted range of headset orientations and/or positions (e.g., range of predicted orientations 1060 in FIG. 10). The image region corresponding to the actual current head orientation and/or position (e.g., measured in Step 11 of the process 803, such as the Left-Eye FoV 654 and a Right-Eye FoV 652 shown in FIG. 6) is extracted from the image region transmitted to the VR headset. Generation of the Left-Eye and Right-Eye views may further include synthesizing a stereo image to replicate the illusion of 3D depth. For example, the images are warped by a disparity based on the depth data from the drone in order to synthesize the eye's unique viewpoint. An eye's viewpoint may see objects occluded by nearer edges in the monocular camera's viewpoint, which may be filled in by blending the surrounding data. This will typically have a minimal effect on the user experience given that, during typical drone flight, objects are significantly far away relative to intraocular distances. Generation of the Left-Eye and Right-Eye views may further include preparing an image for viewing. Preparing the image may include shifting the image to appear in the correct position relative to each lens and eye (e.g. for a VR headset's adjustment of inter-ocular distance). Preparing the image may also include applying an inverse distortion to the image so that the image appears undistorted when viewed through the VR headset's optics.

In some implementations, in order to optimize for memory bandwidth, the battery life, and other characteristics of the receiver-controller device, the process can calculate a warp matrix for each eye that combines all of the above steps in generating the Left-Eye and Right-Eye views, and can (de-)warp the image in one pass for each eye. Calculating a combined warp matrix may include defining a grid mapping between input and output coordinates, and applying each of the above transformations to each grid point. The combined warp matrix may be calculated using one or more processors (e.g., on a CPU, a GPU, or other processor) of the VR headset using parameters that describe the drone camera's lens and motion that may be transmitted from the drone. (De-)warping the image may include rendering an image using the warp matrix, interpolating positions between grid points for each pixel of the image. (De-)warping the image may be performed on one or more processors (e.g., on a CPU, a GPU, or other processor) of the VR headset.

Figure 14:
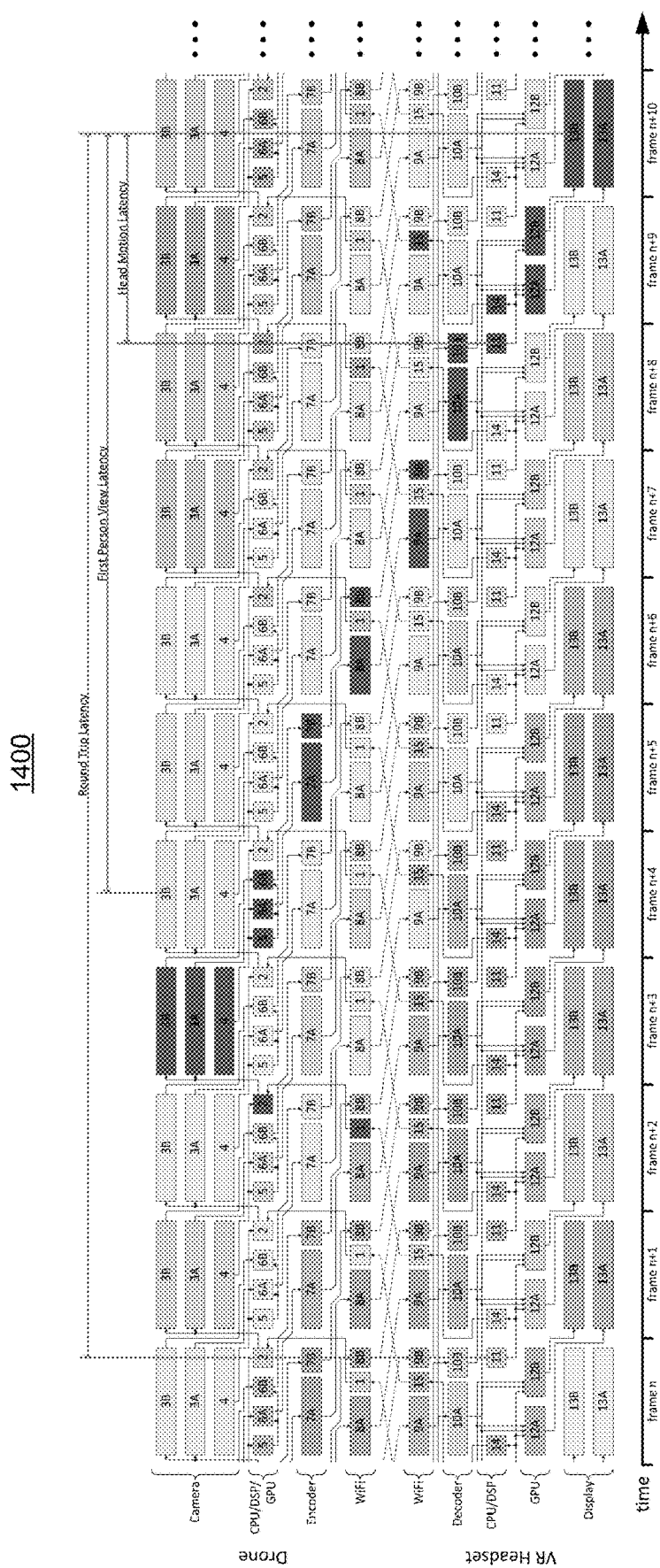
FIG. 14 is a block diagram illustrating an example of a timeline mapping the processes described herein with hardware of a receiver-controller device and a remote-controlled device, in accordance with some examples.

FIG. 14 illustrates an example of a timeline 1400 showing a mapping of the steps of the drone process 801 and the VR headset process 803 (FIG. 8) to hardware of a receiver-controller device (e.g., the VR headset) and a remote-controlled device (e.g., the drone). The timeline 1400 shows the mapping of the algorithm(s) to hardware. Each color represents a different iteration, with a full iteration shown in red. The processes 801 and 803 are parallelizable. For example, a first iteration encodes (7A & 7B) concurrently to a second iteration cropping and dewarping (6A & 6B), and so forth. Head Motion Latency (headset orientation acquisition to display, as shown in FIG. 2), which contributes to a user's feeling of disorientation and nausea, is minimized by performing the processes 801 and 803. In some implementations, all processing that contributes to the Head Motion Latency may be performed locally on the VR Headset, eliminating latency associated with the WiFi link.

Figure 15:
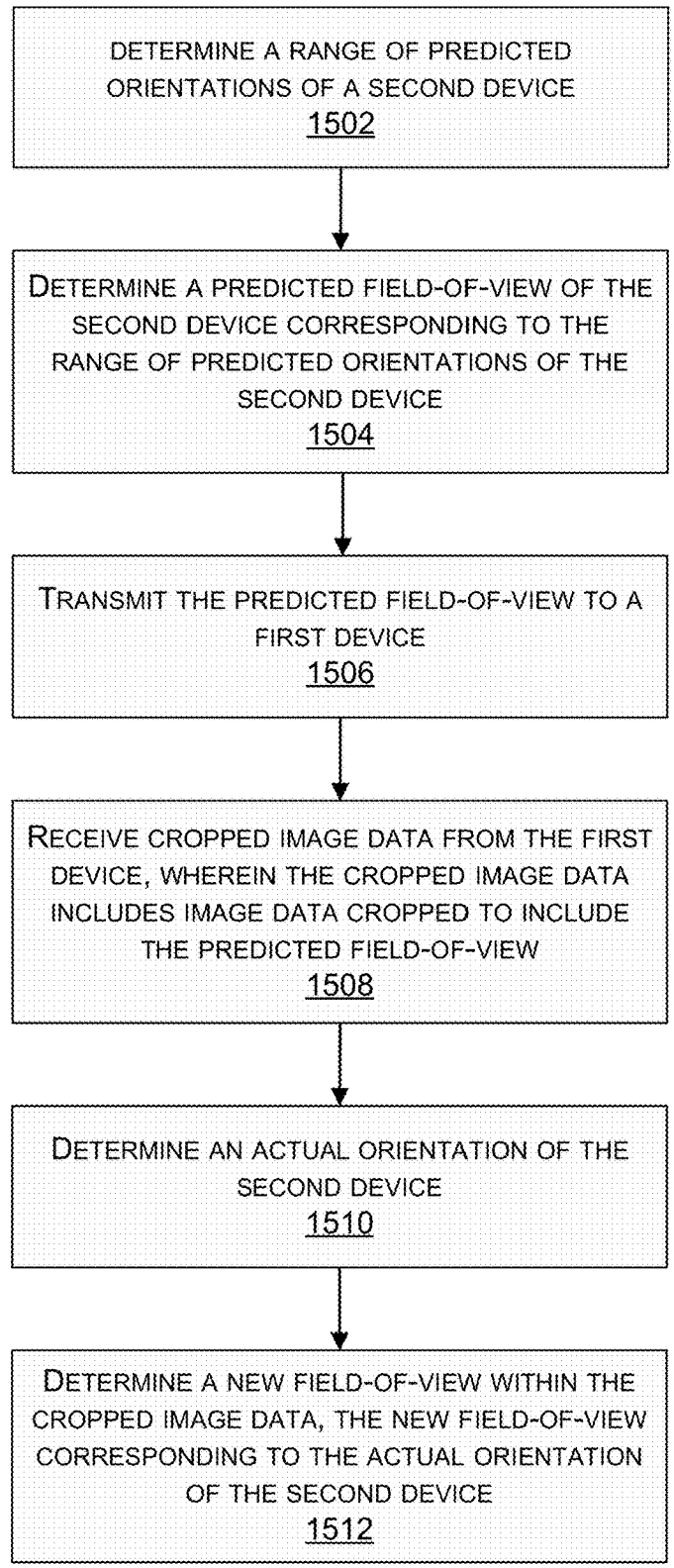
FIG. 15 is a flowchart illustrating an embodiment of a process of processing image data captured by a first device for display on a second device, in accordance with some examples.

FIG. 15 illustrates an example of a process 1500 of processing image data captured by a first device for display on a second device using the techniques described herein. At step 1502, the process 1500 includes determining a range of predicted orientations of the second device. In some examples, determining the range of predicted orientations of the second device includes determining a roundtrip latency time between the first device and the second device, and predicting the range of predicted orientations of the second device during the roundtrip latency time. In some implementations, the range of predicted orientations of the second device are based on predicted movement of the second device, as described above. In some implementations, the range of predicted orientations of the second device is determined using a human kinematic model, as described above. As described previously, the human kinematic model is based on at least one or more of an orientation, an angular velocity, a rate of acceleration or deceleration of the second device, or a combination thereof.

At step 1504, the process 1500 includes determining a predicted field-of-view of the second device corresponding to the range of predicted orientations of the second device. An example of the range of predicted orientations is shown in FIG. 10, as discussed above. In some examples, the predicted field-of-view encompasses a range of fields of view corresponding to predicted orientations of the range of predicted orientations. In some implementations, determining the predicted field-of-view of the second device includes determining an image region encompassing the range of predicted orientations of the second device. An example of such an image region is shown in FIG. 4. The predicted field-of-view can include a world-centric predicted field-of-view, as described previously. In some implementations, the world-centric predicted field-of-view is remapped to a drone-centric field-of-view, and the image data is captured according to the drone-centric field-of-view. The image region can correspond to the drone-centric field-of-view. In some examples, the first device can remap the world-centric field-of-view to the drone-centric field-of-view. In other examples, the second device can remap the world-centric field-of-view to the drone-centric field-of-view.

At step 1506, the process 1500 includes transmitting the predicted field-of-view to the first device. At step 1508, the process 1500 includes receiving cropped image data from the first device. The cropped image data includes image data cropped to include the predicted field-of-view. In one illustrative example, first device can crop only a portion of a full camera view that includes a determined field-of-view (e.g., the predicted field-of-view, a drone-centric field-of-view remapped from the predicted field-of-view, or other field-of-view) in order to reduce the amount of image data provided to the second device.

At step 1510, the process 1500 includes determining an updated orientation of the second device. In some examples, an updated orientation and position of the second device can be determined. The updated orientation and position are also referred to herein as an actual orientation and position. In some examples, the updated orientation (and position in some cases) of the second device results from actual movement of the second device. At step 1512, the process 1500 includes determining an updated field-of-view within the cropped image data, the updated field-of-view corresponding to the updated orientation (and position in some cases) of the second device. The updated field-of-view is also referred to herein as a new field-of-view.

In some examples, the first device is a drone and the second device is a wearable device. In some examples, the first device is a remote-controlled device other than a drone, such as a motorized land vehicle or other remote-controlled device. In some examples, the second device is a head-mounted device or a virtual reality headset.

In some examples, the process 1500 further includes rendering a left eye view and a right eye view corresponding to the updated field-of-view. The left eye view and the right eye view can be generated using the techniques described above.

Figure 16:
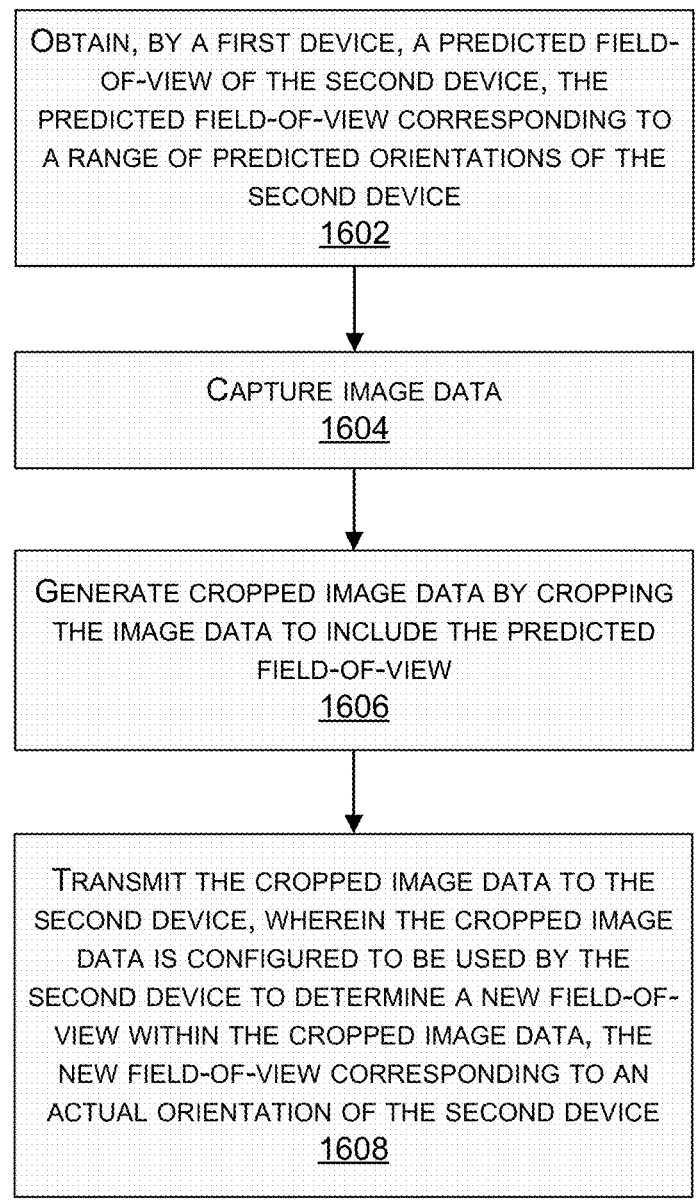
FIG. 16 is a flowchart illustrating an embodiment of a process of providing image data captured by a first device for display on a second device, in accordance with some examples.

FIG. 16 illustrates an example of a process 1600 of providing image data captured by a first device for display on a second device using the techniques described herein. At step 1602, the process 1600 includes obtaining, by the first device, a predicted field-of-view of the second device. The predicted field-of-view corresponds to a range of predicted orientations of the second device. In some examples, the predicted field-of-view encompasses a range of fields of view corresponding to predicted orientations of the range of predicted orientations. In some examples, the range of predicted orientations of the second device are based on predicted movement of the second device. In some examples, the range of predicted orientations of the second device are based on predicted movement of the second device during a round trip latency time between the first device and the second device.

At step 1604, the process 1600 includes capturing image data. In some examples, the predicted field-of-view includes a world-centric predicted field-of-view. In such examples, the process 1600 further includes remapping the world-centric predicted field-of-view to a drone-centric field-of-view, and capturing the image data according to the drone-centric field-of-view.

At step 1606, the process 1600 includes generating cropped image data by cropping the image data to include the predicted field-of-view. At step 1608, the process 1600 includes transmitting the cropped image data to the second device. The cropped image data is configured to be used by the second device to determine an updated field-of-view within the cropped image data. The updated field-of-view corresponds to an updated orientation (and position in some cases) of the second device. In some examples, the updated orientation (and position in some cases) of the second device results from actual movement of the second device.

In some examples, the first device is a drone and the second device is a wearable device. In some examples, the first device is a remote-controlled device other than a drone, such as a motorized land vehicle or other remote-controlled device. In some examples, the second device is a head-mounted device or a virtual reality headset.

In some examples, the processes 1500 and 1600 may be performed by one or more computing devices or apparatuses. For example, the process 1500 can be performed by the receiver-controller device 104 shown in FIG. 1, and the process 1600 can be performed by the remote-controlled device 102 shown in FIG. 1. In some cases, the computing device or apparatus may include a processor, microprocessor, microcomputer, or other component of a device that is configured to carry out the steps of processes 1500 and 1600. In some examples, the computing device or apparatus may include a camera configured to capture video data (e.g., a video sequence) including video frames. For example, the computing device may include a camera device (e.g., a camera with a fisheye lens, or other type of camera device). The camera device may include a video codec. In some examples, a camera or other capture device that captures the video data is separate from the computing device, in which case the computing device receives the captured video data. The computing device may further include a network interface configured to communicate the video data.

Processes 1500 and 1600 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1500 and 1600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The video of the various scenes in an environment captured by a remote-controlled device can contain large amounts of data. For example, digital video data can contain vast amounts of data that puts a strain on available transmission and storage capacities. Video coding can be performed to reduce storage and transmission requirements necessary to handle the large amounts of data. Various video coding techniques may be used to compress video data into a form that uses a lower bit rate while maintaining high video quality.

The techniques discussed herein may be implemented using compressed video or using uncompressed video frames (before or after compression). An example video encoding and decoding system includes a source device (e.g., the remote-controlled device 102) that provides encoded video data to be decoded at a later time by a destination device (e.g., the receiver-controller device 104). In particular, the source device provides the video data to destination device via a computer-readable medium. The source device and the destination device may comprise any of a wide range of devices, including drones or unmanned aerial vehicles (UAVs), virtual reality headsets or head-mounted displays, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing image data captured by a first device for display on a second device, the method comprising:
   determining, by the second device, a range of predicted orientations of the second device;
   determining, by the second device, a predicted field-of-view of the second device, the predicted field-of-view including an image region encompassing the range of predicted orientations of the second device, wherein the predicted field-of-view is larger than an actual field-of-view of the second device by an amount based on the range of predicted orientations of the second device;
   transmitting, by the second device, the predicted field-of-view including the image region to the first device, the predicted field-of-view usable by the first device to crop image data captured by the first device;
   receiving, by the second device, cropped image data from the first device, wherein the cropped image data includes a cropped portion of an image captured by the first device, the cropped portion of the captured image being cropped by the first device to include the image region encompassing the range of predicted orientations of the second device;

determining, by the second device, an updated orientation of the second device; and determining, by the second device, an updated field-of-view within the cropped image data, the updated field-of-view corresponding to the updated orientation of the second device.

2. The method of claim 1, wherein the predicted field-of-view determined by the second device includes a world-centric predicted field-of-view, wherein the world-centric predicted field-of-view is remapped by the first device to a drone-centric field-of-view, and wherein the image data is captured by the first device according to the drone-centric field-of-view.

3. The method of claim 1, further comprising:
rendering a left eye view and a right eye view corresponding to the updated field-of-view.

4. The method of claim 1, wherein the first device is a drone and the second device is a wearable device.

5. The method of claim 1, wherein determining the range of predicted orientations of the second device includes:
determining a roundtrip latency time between the first device and the second device; and
predicting the range of predicted orientations of the second device during the roundtrip latency time.

6. The method of claim 1, wherein the range of predicted orientations of the second device is based on predicted movement of the second device.

7. The method of claim 1, wherein the range of predicted orientations of the second device is determined using a human kinematic model, the human kinematic model being based on at least one or more of an orientation, an angular velocity, and a rate of acceleration or deceleration of the second device.

8. The method of claim 1, wherein the predicted field-of-view encompasses a range of fields of view corresponding to predicted orientations of the range of predicted orientations.

9. The method of claim 1, wherein the updated orientation of the second device results from actual movement of the second device.

10. An apparatus comprising:
a memory configured to store data; and
a processor configured to:
determine a range of predicted orientations of the apparatus;
determine a predicted field-of-view of the apparatus, the predicted field-of-view including an image region encompassing the range of predicted orientations of the apparatus, wherein the predicted field-of-view is larger than an actual field-of-view of the apparatus by an amount based on the range of predicted orientations of the apparatus;
transmit the predicted field-of-view including the image region to a first device, the predicted field-of-view usable by the first device to crop image data captured by the first device;
receive cropped image data from the first device, wherein the cropped image data includes a cropped portion of an image captured by the first device, the cropped portion of the captured image being cropped by the first device to include the image region encompassing the range of predicted orientations of the apparatus;
determine an updated orientation of the apparatus; and
determine an updated field-of-view within the cropped image data, the updated field-of-view corresponding to the updated orientation of the apparatus.

11. The apparatus of claim 10, wherein the predicted field-of-view determined by the apparatus includes a world-centric predicted field-of-view, wherein the world-centric predicted field-of-view is remapped by the first device to a drone-centric field-of-view, and wherein the image data is captured by the first device according to the drone-centric field-of-view.

12. The apparatus of claim 10, wherein the processor is further configured to:
render a left eye view and a right eye view corresponding to the updated field-of-view.

13. The apparatus of claim 10, wherein the apparatus is a wearable device and the first device is a drone.

14. The apparatus of claim 10, wherein determining the range of predicted orientations of the apparatus includes:
determining a roundtrip latency time between the first device and the apparatus; and
predicting the range of predicted orientations of the apparatus during the roundtrip latency time.

15. The apparatus of claim 10, wherein the range of predicted orientations of the apparatus is based on predicted movement of the apparatus.

16. The apparatus of claim 10, wherein the range of predicted orientations of the apparatus is determined using a human kinematic model, the human kinematic model being based on at least one or more of an orientation, an angular velocity, and a rate of acceleration or deceleration of the apparatus.

17. The apparatus of claim 10, wherein the predicted field-of-view encompasses a range of fields of view corresponding to predicted orientations of the range of predicted orientations.

18. The apparatus of claim 10, wherein the updated orientation of the apparatus results from actual movement of the apparatus.

19. A non-transitory computer-readable medium for processing image data captured by a first device for display on a second device, the non-transitory computer-readable medium having stored thereon instructions that, when executed by one or more processors, cause the one or more processor to:
determine a range of predicted orientations of the second device;
determine a predicted field-of-view of the second device, the predicted field-of-view including an image region encompassing the range of predicted orientations of the second device, wherein the predicted field-of-view is larger than an actual field-of-view of the second device by an amount based on the range of predicted orientations of the second device;
transmit the predicted field-of-view including the image region to the first device, the predicted field-of-view usable by the first device to crop image data captured by the first device;
receive cropped image data from the first device, wherein the cropped image data includes a cropped portion of an image captured by the first device, the cropped portion of the captured image being cropped by the first device to include the image region encompassing the range of predicted orientations of the second device;
determine an updated orientation of the second device; and
determine an updated field-of-view within the cropped image data, the updated field-of-view corresponding to the updated orientation of the second device.

20. The non-transitory computer-readable medium of claim 19, wherein the predicted field-of-view determined by the second device includes a world-centric predicted field-of-view, wherein the world-centric predicted field-of-view is remapped by the first device to a drone-centric field-of-view, and wherein the image data is captured by the first device according to the drone-centric field-of-view.

21. The non-transitory computer-readable medium of claim 19, further comprising instructions that, when executed by the one or more processors, cause the one or more processors to:
render a left eye view and a right eye view corresponding to the updated field-of-view.

22. The non-transitory computer-readable medium of claim 19, wherein the first device is a drone and the second device is a wearable device.

23. The non-transitory computer-readable medium of claim 19, wherein determining the range of predicted orientations of the second device includes:
determining a roundtrip latency time between the first device and the second device; and
predicting the range of predicted orientations of the second device during the roundtrip latency time.

24. The non-transitory computer-readable medium of claim 19, wherein the range of predicted orientations of the second device is based on predicted movement of the second device.

25. The non-transitory computer-readable medium of claim 19, wherein the range of predicted orientations of the second device is determined using a human kinematic model, the human kinematic model being based on at least one or more of an orientation, an angular velocity, and a rate of acceleration or deceleration of the second device.

26. The non-transitory computer-readable medium of claim 19, wherein the predicted field-of-view encompasses a range of fields of view corresponding to predicted orientations of the range of predicted orientations.

27. The non-transitory computer-readable medium of claim 19, wherein the updated orientation of the second device results from actual movement of the second device.

* * * * *